US012098595B2

(12) United States Patent
Pham et al.

(10) Patent No.: US 12,098,595 B2
(45) **Date of Patent: *Sep. 24, 2024**

(54) MOTOR DRIVE SYSTEM FOR WINDOW COVERING SYSTEM WITH CONTINUOUS CORD LOOP

(71) Applicant: Ryse Inc., Toronto (CA)

(72) Inventors: Trung Duc Pham, Brampton (CA); Alan Wing Hor Cheng, Mississauga (CA); Marc Rashad Bishara, Toronto (CA)

(73) Assignee: Ryse Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,266

(22) Filed: Dec. 5, 2022

(65) Prior Publication Data

US 2023/0101299 A1 Mar. 30, 2023

Related U.S. Application Data

(63) Continuation of application No. 16/681,037, filed on Nov. 12, 2019, now Pat. No. 11,519,221, which is a (Continued)

(30) Foreign Application Priority Data

Nov. 6, 2014 (CA) ...................................... 2870983

(51) Int. Cl.

*E06B 9/40* (2006.01)
*E06B 9/68* (2006.01)
*E06B 9/74* (2006.01)

(52) U.S. Cl.

CPC .................. *E06B 9/40* (2013.01); *E06B 9/68* (2013.01); *E06B 9/74* (2013.01); *E06B 2009/6818* (2013.01); *E06B 2009/6827* (2013.01)

(58) Field of Classification Search

CPC ...... E06B 9/40; E06B 9/68; E06B 2009/6818; E06B 2009/6827; E06B 9/74; E06B 9/32; (Continued)

(56) References Cited

U.S. PATENT DOCUMENTS 2,788,481 A 4/1957 Lui et al.
2,798,194 A 7/1957 Cantin
(Continued)

FOREIGN PATENT DOCUMENTS

CA 398637 A 8/1941
CA 926345 A 5/1973
(Continued)

OTHER PUBLICATIONS

Second Office Action on CN App. 201980092944.7 dated May 23, 2023 (14 pages).
(Continued)

*Primary Examiner* — Abe Massad
(74) *Attorney, Agent, or Firm* — FOLEY & LARDNER LLP

(57) ABSTRACT

A motor-operated drive system for a window covering system including a headrail, a mechanism associated with the headrail to spread and retract the window covering, and a continuous cord loop extending below the headrail for actuating the mechanism to spread and retract the window covering. The drive system includes a motor, a driven wheel that engages and advances the continuous cord loop, and a coupling mechanism for coupling the driven wheel to a rotating output shaft of the motor for rotation of the driven wheel. The drive system includes a channel system for redirecting the continuous cord loop engaged by the driven wheel, or other mechanism for configuring the drive system so that continuous cord loop extends in a substantially vertical orientation. The coupling mechanism includes an (Continued)

engaged configuration in which rotation of the output shaft of the motor causes rotation of the driven wheel, and a disengaged configuration.

20 Claims, 20 Drawing Sheets

Related U.S. Application Data continuation of application No. 15/606,079, filed on May 26, 2017, now Pat. No. 10,494,863, which is a continuation of application No. 14/934,642, filed on Nov. 6, 2015, now Pat. No. 9,670,723.

(60) Provisional application No. 62/166,484, filed on May 26, 2015.

(58) Field of Classification Search
CPC ... E06B 9/322; E06B 9/42; E06B 9/70; E06B 2009/6845; E06B 9/78; E06B 2009/785; A47H 5/0325; A47H 11/06
See application file for complete search history.

(56) References Cited

U.S. PATENT DOCUMENTS

| | | | | |
|---|---|---|---|---|
| 3,096,078 | A | 7/1963 | Steingass et al. | |
| 3,117,767 | A | 1/1964 | McLean et al. | |
| 3,269,454 | A | 8/1966 | Gill et al. | |
| 3,561,520 | A | 2/1971 | Gill | |
| 3,658,230 | A | 4/1972 | Enock | |
| 4,031,944 | A | 6/1977 | Morrison et al. | |
| 4,131,831 | A | 12/1978 | Bochenek et al. | |
| 4,610,294 | A | 9/1986 | Anesi et al. | |
| 4,618,804 | A | 10/1986 | Iwasaki | |
| 4,775,039 | A | 10/1988 | Sunakawa | |
| 4,819,708 | A | 4/1989 | Onosato et al. | |
| 4,856,574 | A | 8/1989 | Minami et al. | |
| 4,896,713 | A | 1/1990 | Rademacher | |
| 4,902,953 | A | 2/1990 | Kraft et al. | |
| 4,914,360 | A | 4/1990 | Hsieh et al. | |
| 4,956,588 | A | 9/1990 | Ming | |
| 4,958,112 | A | 9/1990 | Zerillo | |
| 5,033,527 | A | 7/1991 | Ouvrard et al. | |
| 5,170,108 | A | 12/1992 | Peterson et al. | |
| 5,270,629 | A | 12/1993 | Hsieh | |
| 5,362,222 | A | 11/1994 | Faig et al. | |
| 5,414,334 | A | 5/1995 | Cheron | |
| 5,465,980 | A | 11/1995 | Maurin | |
| 5,532,560 | A | 7/1996 | Element et al. | |
| 5,540,269 | A | 7/1996 | Plumer | |
| 5,547,008 | A | 8/1996 | Sullivan | |
| 5,793,174 | A | 8/1998 | Kovach et al. | |
| 5,847,525 | A | 12/1998 | Cheron et al. | |
| 5,959,430 | A | 9/1999 | Yuki et al. | |
| 6,076,592 | A | 6/2000 | Grutzner | |
| 6,148,893 | A * | 11/2000 | Cadorette | E06B 9/32 160/177 V |
| 6,283,190 | B1 | 9/2001 | Hu et al. | |
| 6,446,693 | B1 | 9/2002 | Anderson et al. | |
| 6,465,980 | B1 | 10/2002 | Orsat | |
| 6,516,858 | B1 | 2/2003 | Anderson et al. | |
| 6,598,652 | B1 | 7/2003 | Montesinos Alonso | |
| 6,827,121 | B2 | 12/2004 | Park | |
| 6,850,017 | B1 | 2/2005 | Domel et al. | |
| 6,935,403 | B2 | 8/2005 | Killo et al. | |
| 7,337,825 | B1 | 3/2008 | Erbe | |
| 7,360,576 | B2 | 4/2008 | Lin | |
| 7,389,806 | B2 | 6/2008 | Kates | |
| 7,466,090 | B2 | 12/2008 | Meewis et al. | |
| 7,599,612 | B2 | 10/2009 | Moseley et al. | |
| 7,919,939 | B2 | 4/2011 | Mosbrucker | |
| 8,033,374 | B2 | 10/2011 | Gunton | |
| 8,044,626 | B2 | 10/2011 | Adamus et al. | |
| 8,368,328 | B2 | 2/2013 | Mullet et al. | |
| 8,498,747 | B2 | 7/2013 | Feldstein | |
| 8,587,242 | B2 | 11/2013 | Berman et al. | |
| 8,939,190 | B2 | 1/2015 | Mullet et al. | |
| 9,072,398 | B2 | 7/2015 | Choo et al. | |
| 9,080,382 | B2 | 7/2015 | Lagarde et al. | |
| 9,161,649 | B2 | 10/2015 | Rastegar | |
| 9,534,442 | B2 | 1/2017 | Derk et al. | |
| 9,609,114 | B2 | 3/2017 | Mullet et al. | |
| 9,657,516 | B2 | 5/2017 | Graybar | |
| 9,670,723 | B2 | 6/2017 | Pham et al. | |
| 9,879,475 | B2 | 1/2018 | Mullet et al. | |
| 10,104,997 | B2 | 10/2018 | Pham et al. | |
| 10,494,863 | B2 | 12/2019 | Pham et al. | |
| 10,626,668 | B2 | 4/2020 | Hall et al. | |
| 10,863,846 | B2 | 12/2020 | Pham et al. | |
| 11,178,992 | B2 | 11/2021 | Pham et al. | |
| 2001/0050538 | A1 | 12/2001 | Kovach et al. | |
| 2003/0168185 | A1 | 9/2003 | Wen et al. | |
| 2003/0168187 | A1 | 9/2003 | Wen et al. | |
| 2004/0026049 | A1 | 2/2004 | Park | |
| 2006/0162877 | A1 | 7/2006 | Chou | |
| 2007/0056697 | A1 | 3/2007 | Chen | |
| 2008/0236763 | A1 | 10/2008 | Kates | |
| 2008/0258644 | A1 | 10/2008 | Altonen et al. | |
| 2009/0251831 | A1 | 10/2009 | Shiba et al. | |
| 2010/0087958 | A1 * | 4/2010 | Mullet | G05B 19/0421 700/275 |
| 2012/0053731 | A1 * | 3/2012 | Feldstein | E06B 9/70 160/311 |
| 2012/0090797 | A1 | 4/2012 | Mullet et al. | |
| 2012/0160630 | A1 * | 6/2012 | Cannaverde | E06B 9/90 160/321 |
| 2012/0193035 | A1 | 8/2012 | Malekpour | |
| 2012/0261078 | A1 | 10/2012 | Adams et al. | |
| 2012/0261079 | A1 | 10/2012 | Chambers et al. | |
| 2013/0135333 | A1 | 5/2013 | Chen et al. | |
| 2013/0146436 | A1 | 6/2013 | Ticoalu et al. | |
| 2013/0180676 | A1 | 7/2013 | Berman et al. | |
| 2014/0008028 | A1 | 1/2014 | Rastegar | |
| 2014/0138033 | A1 | 5/2014 | Lagarde et al. | |
| 2014/0224437 | A1 | 8/2014 | Colson et al. | |
| 2014/0359976 | A1 | 12/2014 | Lu et al. | |
| 2015/0074584 | A1 | 3/2015 | Sasaki et al. | |
| 2015/0288316 | A1 | 10/2015 | Hall et al. | |
| 2015/0330144 | A1 | 11/2015 | Jung et al. | |
| 2015/0349402 | A1 | 12/2015 | Camden et al. | |
| 2015/0376943 | A1 | 12/2015 | Slupik et al. | |
| 2016/0032647 | A1 | 2/2016 | Adreon et al. | |
| 2016/0127530 | A1 | 5/2016 | Mullet et al. | |
| 2016/0130874 | A1 | 5/2016 | Pham et al. | |
| 2017/0095103 | A1 | 4/2017 | Pham et al. | |
| 2017/0257927 | A1 | 9/2017 | Camden et al. | |
| 2017/0260806 | A1 | 9/2017 | Adams et al. | |
| 2018/0106105 | A1 | 4/2018 | Anthony et al. | |
| 2018/0202224 | A1 | 7/2018 | Kumar | |
| 2019/0150651 | A1 | 5/2019 | Pham et al. | |
| 2020/0080371 | A1 | 3/2020 | Pham et al. | |

FOREIGN PATENT DOCUMENTS

| | | | |
|---|---|---|---|
| CA | 1283471 | C | 4/1991 |
| CA | 2162443 | A1 | 5/1996 |
| CA | 2385368 | A1 | 9/2003 |
| CA | 2532092 | A1 | 7/2007 |
| CA | 2804238 | A1 | 1/2012 |
| CA | 2766358 | A1 | 7/2012 |
| CA | 2870983 | | 5/2016 |
| CA | 2966999 | | 5/2016 |
| CN | 2279130 | Y | 4/1998 |
| CN | 2330773 | Y | 7/1999 |
| CN | 2390001 | Y | 8/2000 |
| CN | 201332933 | Y | 10/2009 |
| CN | 203220229 | U | 10/2013 |
| CN | 203271549 | U | 11/2013 |
| CN | 107615187 | A | 1/2018 |
| CN | 108463605 | | 8/2018 |
| CN | 108463605 | A | 8/2018 |
| DE | 89 03 355 | U1 | 6/1989 |

(56) References Cited

FOREIGN PATENT DOCUMENTS

| | | | |
|---|---|---|---|
| DE | 19837267 | A1 | 2/2000 |
| EP | 1 700 996 | A2 | 9/2006 |
| EP | 2 682 560 | A2 | 1/2014 |
| EP | 2 743 442 | A1 | 6/2014 |
| EP | 3 215 702 | A1 | 9/2017 |
| GB | 0 236 275 | A | 7/1925 |
| GB | 2 362 675 | A | 11/2001 |
| GB | 2 362 675 | B | 12/2003 |
| WO | WO-2014/165367 | A1 | 10/2014 |
| WO | WO-2016/070279 | | 5/2016 |
| WO | WO-2017/054083 | A1 | 4/2017 |
| WO | WO-2018/037118 | A1 | 3/2018 |

OTHER PUBLICATIONS

European Patent Office Search Report on EP Application 19911107.1 dated Feb. 21, 2023 (18 pages).
"Axis Gear—Calibration Demo"—Video published on May 31, 2016, with video playback webpage of YouTube, LLC, at https://www.youtube.com/watch?v=GYgtDjH1t_w.
"Axis Gear—Installation Demo"—Video published on May 3, 2016, with video playback webpage of YouTube, LLC, at https://www.youtube.com/watch?v--Huzzb1mAB9l.
"Axis Gear—Motorize Your Window Shades & Curtains"—Video published on Nov. 7, 2015, with video playback webpage of YouTube, LLC, https:/www.youtube.com/watch?v=5PgSFl94pDE.
"Axis Gear—The Timeless Art of Seduction"—Video published on Nov. 9, 2015, with video playback webpage of YouTube, LLC, at http://www.youtube.com/watch?v==zgZBNhEQaYM.
"Axis Gear raising window shades"—Video published on Dec. 29, 2015, with video playback webpage of YouTube, LLC, at https://www.youtube.com/watch?v=LUB0xSB2Evw.
"Axis Gear—Motorize your window shades"—Video published on Jun. 28, 2016, with video playback web page of YouTube, LLC, at https://www.youtube.com/watch?v==E12YGTvcbCw. iw1~?,v.,cmtuhe.corniwatcl(\=E12Y GTvchCw.
"Cedia 2016: Axis Launches Axis Gear at Cedia 2016"—Video published on Sep. 15, 2016, with video playback webpage of YouTube, LLC, at https://www.youtube.com/watch?v==9PLOkA1tfvc.
"Controlling the Axis Gear"—Video published on Oct. 27, 2015, with video playback webpage of YouTube, LLC, at https://www.youtube.com/watch?y=e2 WSkKYx~zM.
"Installing axis Gear"—Video published on Oct. 27, 2015, with video playback webpage of YouTube, LLC, at https://www.youtube.com/watch?v==u61BD16e720.
"Lifestyle Video Axis Gear 2MIN"—Video published on Apr. 7, 2016, with video playback webpage of YouTube, LLC, at https://www.youtube.com/watch?v==NvJxe3tzrPc.
"Motorize your window shades with Axis Gear"—Video published on Oct. 26, 2015, with video playback webpage of YouTube, LLC, at https://www.youtube.com/watch?v==dJgA8LcjnnU.
"Wake Up to Sunshine with Axis Gear"—Video published on Nov. 3, 2015, with video playback webpage of YouTube, LLC, at https://www.youtube.com/watch?v=RE2hMiJdvnQ.
"Driven Pulley", ScienceDirect Topics, retrieved Feb. 12, 2021 from URL: https://www.sciencedirect.com/topics/engineering/driven-pulley, 2021 (37 pages).
Bortnowski et al., "Tests of Belt Linear Speed for Identification of Frictional Contact Phenomena", Sensors, vol. 20, 2020 (13 pages).
CA Office Action on CA Appl. Ser. No. 3000108 dated Oct. 14, 2022 (4 pages).
Canadian Office Action issued in CA Appl. Ser. No. 2,966,999, dated Feb. 20, 2019 (5 pages).
Chinese Decision of Rejection issued in CN Appl. Ser. No. 201580065177.2, dated Apr. 24, 2020 (7 pages).
Chinese Office Action issued in CN Appl. Ser. No. 2015/80065177.2, dated Aug. 24, 2018 (12 pages).
Chinese Office Action issued in CN Appl. Ser. No. 2015/80065177.2, dated Jun. 5, 2019 (9 pages).
Chinese Office Action issued in CN Appl. Ser. No. 2015/80065177.2, dated Sep. 10, 2019 (16 pages).
Chinese Office Action issued in CN Appl. Ser. No. 2016800706680, dated Mar. 7, 2019 (10 pages).
Chinese Office Action issued in CN Appl. Ser. No. 201911099117.9 dated Apr. 2, 2021 (11 pages).
CN Office Action CN Appl. Ser. No. 201980092944.7 dated Oct. 31, 2022 (11 pages).
Examination Report for CA 3066140 dated Nov. 16, 2021 (3 pages).
Extended European Search Report dated Jul. 2, 2019, issued in corresponding European Application No. 16849985.3, 8 pages.
Extended European Search Report, dated Aug. 13, 2018, issued in corresponding European Patent Application No. EP 15 85 6630, 10 pages.
Foreign Action other than Search Report on CA 3066140 dated Apr. 29, 2022 (3 pages).
Hwangbo et al., "Cable-Driven Actuation for Highly Dynamic Robotic Systems", IEEE/RSJ International Conference on Intelligent Robots and Systems (IROS), Jun. 27, 2018, arXiv:1806.10632v1 (9 pages).
Information Disclosure Statement filed Feb. 6, 2019.
Information Disclosure Statement filed Apr. 13, 2017.
Information Disclosure Statement on U.S. Appl. No. 15/282,686, filed Oct. 12, 2016 (3 pages).
International Preliminary Report on Patentability, Ch. I, for PCT/CA2019/050715 dated Aug. 5, 2021 (7 pages).
International Search Report and the Written Opinion of the International Searching Authority mailed Sep. 17, 2019 in corresponding International Application No. PCT/CA2019/050715, 12 pages.
International Search Report and Written Opinion in PCT Appl. Ser. No. PCT/CA2015/051140, dated Jan. 11, 2016 (8 pages).
International Search Report and Written Opinion on PCT Appl. Ser. No. PCT/CA2022/050285 dated May 16, 2022 (11 pages).
International Search Report issued in PCT Appl. Ser. No. PCT/CA2016/051138, date of mailing of International Search Report Jan. 17, 2017 (6 pages).
Jin et al., "Geometric Parameter Calibration for a Cable-Driven Parallel Robot Based on a Single One-Dimensional Laser Distance Sensor Measurement and Experimental Modeling", Sensors, vol. 18, No. 7, Jul. 2018, pp. 2392 (27 pages).
Karanth et al., "An Experimental Technique to Measure Creep in Conveyor Belt Drives", Bulk Solids Handling, vol. 14, Nov. 4, 1994, retrieved Feb. 12, 2021 from URL: https://www.ckit.co.za/secure/conveyor/papers/bulk-solids-handling/experimentaltech1.htm (7 pages).
Lutron Intelligent Hembar AlignmentTM; Technical White Paper; May 2010; 8 pages.
Non-Final Office Action for U.S. Appl. No. 16/681,037 dated Dec. 7, 2021 (14 pages).
Non-Final Office Action in U.S. Appl. No. 14/934,642 dated Sep. 15, 2016, 8 pages.
Non-Final Office Action issued in U.S. Appl. No. 15/282,686 dated Feb. 1, 2018 (15 pages).
Non-Final Office Action on U.S. Appl. No. 16/161,877 dated Jan. 1, 2021 (12 pages).
Non-Final Office Action on U.S. Appl. No. 16/255,647 dated Mar. 6, 2020 (11 pages).
Notice of Allowance for U.S. Appl. No. 16/161,877 dated Oct. 21, 2021 (7 pages).
Notice of Allowance for U.S. Appl. No. 17/121,244 dated Nov. 4, 2021 (8 pages).
Notice of Allowance issued on U.S. Appl. No. 16/161,877 dated Jun. 10, 2021 (10 pages).
Notice of Allowance on U.S. Appl. No. 15/282,686 dated Jun. 20, 2018. 11 pages.
Notice of Allowance on U.S. Appl. No. 16/681,037 Dtd Aug. 1, 2022.
Notice of Allowance on U.S. Appl. No. 16/255,647 dated Aug. 24, 2020 (13 pages).
Notice of Allowance on U.S. Appl. No. 16/255,647 dated Jul. 1, 2020 (13 pages).

(56) References Cited

OTHER PUBLICATIONS

Notice of Allowance on U.S. Appl. No. 16/681,037 dated Jun. 6, 2022 (8 pages).
Notification of Reexamination for CN 201580065177.2 dated Sep. 13, 2021 (9 pages).
Piao et al., "Open-loop position control of a polymer cable-driven parallel robot via a viscoelastic cable model for high payload workspaces", Advances in Mechanical Engineering, vol. 9, No. 12, 2017, DOI: 10.1177/1687814017737199 (12 pages).
Reexamination Decision for CN 201580065177.2 dated Jan. 29, 2022 (40 pages).
Second Office Action for CN 201911099117.9 dated Aug. 31, 2021 (7 pages).
U.S. Non Final Office Action on U.S. Appl. No. 17/694,465 dated Sep. 14, 2022 (7 pages).
U.S. Notice of Allowance on U.S. Appl. No. 17/694,465 dated Oct. 27, 2022 (10 pages).
Extended European Search Report on EPO App. 22201695.8 dated Jun. 2, 2023 (16 pages).
Foreign Search Report on EPO Application 22201695.8 dated Jan. 24, 2023 (14 pages).
Second Examiner's Report on CA App. 3,000,108 dated Mar. 20, 2023 (4 pages).
Second Office Action dated Jun. 1, 2024 on CN App. 202210375711.1 (12 pages incl. translation).

* cited by examiner

MOTOR DRIVE SYSTEM FOR WINDOW COVERING SYSTEM WITH CONTINUOUS CORD LOOP

CROSS-REFERENCE TO RELATED APPLICATIONS

The present application is a continuation of U.S. Ser. No. 16/681,037, entitled "MOTOR DRIVE SYSTEM FOR WINDOW COVERING SYSTEM WITH CONTINUOUS CORD LOOP," filed Nov. 12, 2019, which is a continuation of U.S. Ser. No. 15/606,079, entitled "MOTOR DRIVE SYSTEM FOR WINDOW COVERING SYSTEM WITH CONTINUOUS CORD LOOP," filed May 26, 2017, which is a continuation of U.S. Ser. No. 14/934,642, entitled "MOTOR DRIVE SYSTEM FOR WINDOW COVERING SYSTEM WITH CONTINUOUS CORD LOOP," filed Nov. 6, 2015, which claims the benefit of U.S. Provisional Application No. 62/166,484 filed May 26, 2015, entitled "MOTOR DRIVE SYSTEM FOR WINDOW COVERING SYSTEM WITH CONTINUOUS CORD LOOP," all of which are hereby incorporated by reference.

TECHNICAL FIELD

The present disclosure relates to a system for spreading and retracting window coverings that use continuous cord loops.

BACKGROUND

Systems for spreading and retracting coverings for architectural openings such as windows, archways and the like are commonplace. Systems for spreading and retracting such retractable coverings, may operate for example by raising and lowering the coverings, or by laterally opening and closing the coverings. Such window covering systems typically include a headrail, in which the working components for the covering are primarily confined. In some versions, the window covering system includes a bottom rail extending parallel to the headrail, and some form of shade material which might be fabric or shade or blind material, interconnecting the headrail and bottom rail. The shade or blind material is movable with the bottom rail between spread and retracted positions relative to the headrail. For example, as the bottom rail is lowered or raised relative to the headrail, the fabric or other material is spread away from the headrail or retracted toward the headrail so it can be accumulated either adjacent to or within the headrail. Such mechanisms can include various control devices, such as pull cords that hang from one or both ends of the headrail. The pull cord may hang linearly, or in the type of window covering systems addressed by the present invention, the pull cord may assume the form of a closed loop of flexible material such as a rope, cord, or beaded chain, herein referred to as a continuous cord loop.

In some instances, window covering systems have incorporated a motor that actuates the mechanism for spreading and retracting the blind or shade material, and controlling electronics. Most commonly, the motor and controlling electronics has been mounted within the headrail avoiding the need for pull cords such as a continuous cord loop. Using such motor-operated systems or devices, the shade or blind material can be spread or retracted by user actuation or by automated operation e.g., triggered by a switch or photocell.

However generally such motor-operated devices have been designed to replace the normal mechanisms that come installed with the window covering system. For homeowners who already have window blinds, installation of such motor-operated device requires the installer to remove the current blinds, retrofit it with the motors, then reinstall the blind. Such motor-operated devices are extremely burdensome or simply impractical for a typical homeowner to install, instead requiring installation by a trained service professional. This increases the cost of such devices.

Although it is known to design motor-operated devices for window covering systems for installation apart from the headrail, such system designs have been inadequate to permit installation by a typical homeowner. Installing such a motor-operated device requires mounting the device within or adjacent the architectural opening, and as architectural openings and existing window covering systems installations vary widely in configuration, the installation requires careful planning. Furthermore, such devices must work in coordination with the mechanisms at the headrail for spreading and retracting such retractable coverings, and remote mechanisms for operating such systems such as pull cords can easily fail due to misalignment, tangling, binding and the like. For these reasons, prior motor-operated device designs of this type also generally require installation by a trained service professional.

Another consideration in the operation of motor-operated devices for window covering systems is that it is desirable to permit manual operation of the window covering system, for example in the event that the motor-operated device loses power.

For the foregoing reasons, there is a need for motor-operated devices designed for operation with existing window covering systems over a variety of architectural opening settings. There is a need for motor-operated devices of this type that can be installed without requiring a trained service professional. Further, there is a need for motor-operated devices that permit manual operation of the window covering system, for example in the event that the motor-operated device loses power.

SUMMARY

The embodiments described herein include a motor-operated drive system for a window covering system including a headrail, a mechanism associated with the headrail for spreading and retracting a window covering, and a continuous cord loop extending below the headrail for actuating the mechanism to spread and retract the window covering. The drive system includes a motor, a driven wheel that engages and advances the continuous cord loop, and a coupling mechanism for coupling the driven wheel to a rotating output shaft of the motor for rotation of the driven wheel.

In an embodiment, the drive system includes a housing, and the continuous cord loop extends from the housing to the headrail of the window covering system. The drive system includes a mechanism for configuring the drive system so that continuous cord loop extends below the headrail in a substantially vertical orientation. In one aspect of this embodiment, the mechanism for configuring the drive system is a channel system for redirecting the continuous cord loop engaged by the driven wheel.

In another embodiment, the coupling mechanism includes an engaged configuration in which rotation of the output shaft of the motor causes rotation of the driven wheel, and a disengaged configuration in which the driven wheel is not rotated by the output shaft of the motor. In another embodiment, the coupling mechanism is electrically powered, under control of a controller for the motor and the electrically powered coupling mechanism. The electrically powered coupling mechanism is in an engaged configuration when the controller is in a machine-control state or when the controller is in a user-control state. The electrically powered coupling mechanism is in a disengaged configuration when the controller is in a manual-operation state.

In one embodiment, a drive system, for use in combination with a window covering system including a headrail, a mechanism associated with the headrail for spreading and retracting a window covering, and a continuous cord loop extending below the headrail for actuating the mechanism associated with the headrail for spreading and retracting the window covering, the drive system comprises a motor configured to rotate an output shaft of the motor; a driven wheel; a coupling mechanism coupling the driven wheel to the output shaft of the motor configured to rotate the driven wheel in the drive system, the continuous cord loop being engaged by the driven wheel to advance the continuous cord loop during rotation of the driven wheel; and a housing for the drive system including at least one opening, the continuous cord loop being routed from the driven wheel to the at least one opening in the housing, and the continuous cord loop extending below the headrail of the window covering system to the at least one opening in the housing; wherein the coupling mechanism includes an engaged configuration in which rotation of the output shaft of the motor causes rotation of the driven wheel, and a disengaged configuration in which the driven wheel is not rotated by the output shaft of the motor.

In another embodiment, a drive system, for use in combination with a window covering system including a mechanism for spreading and retracting a window covering, and a continuous cord loop extending below the mechanism for spreading and retracting the window covering, the drive system comprises a motor configured to operate under electrical power to rotate an output shaft of the motor; a driven wheel; an electrically powered coupling mechanism coupling the driven wheel to the output shaft of the motor configured for rotation in the drive system, wherein the continuous cord loop is engaged by the driven wheel to advance the continuous cord loop during rotation of the driven wheel; and a controller for the motor and the electrically powered coupling mechanism, wherein at given times during operation of the drive system, the controller may be in one of a machine-control state, a user-control state, and a manual-operation state; wherein the electrically powered coupling mechanism includes an engaged configuration in which rotation of the output shaft of the motor causes rotation of the driven wheel, and a disengaged configuration in which the driven wheel is not rotated by the output shaft of the motor; wherein the electrically powered coupling mechanism is in the engaged configuration when the controller is in the machine-control state or when the controller is in the user-control state; and wherein the electrically powered coupling mechanism is in the disengaged configuration when the controller is in the manual-operation state.

In another embodiment, a drive system, for use in combination with a window covering system including a headrail, a mechanism associated with the headrail for spreading and retracting a window covering and including a first clutch, and a continuous cord loop for actuating the mechanism associated with the headrail for spreading and retracting the window covering, the continuous cord loop having a first loop end adjacent the first clutch, the drive system comprises a motor configured to rotate an output shaft of the motor; a driven wheel; and a coupling mechanism coupling the driven wheel to the output shaft of the motor configured to rotate the driven wheel in the drive system, the continuous cord loop extending below the headrail in a substantially vertical orientation and having a second loop end engaged by the driven wheel to advance the continuous cord loop during rotation of the driven wheel; wherein the coupling mechanism includes an engaged configuration in which rotation of the output shaft of the motor causes rotation of the driven wheel, and a disengaged configuration in which the driven wheel is not rotated by the output shaft of the motor.

In another embodiment, a drive system, for use in combination with a window covering system including a headrail, a mechanism associated with the headrail for spreading and retracting a window covering, and a continuous cord loop extending below the headrail for actuating the mechanism associated with the headrail for spreading and retracting the window covering; comprises a motor configured to rotate an output shaft of the motor; a driven wheel coupled to the output shaft of the motor for rotation of the driven wheel in the drive system, the continuous cord loop being engaged by the driven wheel to advance the continuous cord loop during rotation of the driven wheel; and a housing for the drive system, the continuous cord loop extending from the housing to the headrail of the window covering system; wherein the drive system is configured so that continuous cord loop extends below the headrail in a substantially vertical orientation.

In yet another embodiment, a drive system, for use in combination with a window covering system including a mechanism for spreading and retracting a window covering, and a continuous cord loop that extends below the mechanism for spreading and retracting the window covering, comprises a motor, for rotating the output shaft of the motor; a driven wheel; a gear assembly coupling the driven wheel to the output shaft of the motor for rotation of the driven wheel in the drive system, the continuous cord loop being engaged by the driven wheel to advance the continuous cord loop during rotation of the driven wheel; a housing for the drive system, the continuous cord loop extending from the housing to the mechanism for spreading and retracting the window covering; and a channel system for redirecting the continuous cord loop engaged by the driven wheel.

In a further embodiment, a drive system, for use in combination with a window covering system including a headrail, a mechanism associated with the headrail for spreading and retracting a window covering, and a continuous cord loop extending below the headrail for actuating the mechanism associated with the headrail for spreading and retracting the window covering; comprises a motor configured for rotating an output shaft of the motor; a driven wheel coupled to the output shaft of the motor for rotation of the driven wheel in the drive system, the continuous cord loop being engaged by the driven wheel to advance the continuous cord loop during rotation of the driven wheel; a housing for the drive system, the housing having a channel configured for routing the continuous cord loop to the driven wheel; and a mechanism configured for locking the continuous cord loop into the driven wheel, wherein the continuous cord loop is routed through the channel in the housing to the driven wheel.

The embodiments described herein include a drive system for use with a window covering system, the window covering system including a roller blind mechanism for raising and lowering a window covering fabric and a continuous cord loop extending below the roller blind mechanism; the drive system comprising a motor configured to operate under electrical power to rotate an output shaft of the motor; a driven wheel; an electrically powered coupling mechanism including a gear assembly driven by the output shaft of the motor configured to rotate the driven wheel during rotation of the output shaft of the motor, wherein the driven wheel engages the continuous cord loop and is configured to advance the continuous cord loop during rotation of the driven wheel, and wherein the electrically powered coupling mechanism includes an engaged configuration in which rotation of the output shaft of the motor causes rotation of the driven wheel, and a disengaged configuration in which the driven wheel is not rotated by the output shaft of the motor; and a controller for the motor and the electrically powered coupling mechanism, wherein at given times during operation of the drive system, the controller is in one of a machine-control state, a manual-operation state, and a user-control state; wherein the electrically powered coupling mechanism is in the engaged configuration when the controller is in the machine-control state or when the controller is in the user-control state, and the electrically powered coupling mechanism is in the disengaged configuration when the controller is in the manual-operation state; wherein the controller for the motor and the electrically powered coupling mechanism is configured to receive one or more inputs, the one or more inputs comprising at least one of a command from a building automation system, a command from a hub, a command from a smart device, data from the building automation system, data from the hub, and data from the smart device, and wherein the controller is configured to process the one or more inputs to control operation of the drive system to effect one or more window covering functions.

The embodiments described herein further include a drive system for use with a window covering system, the window covering system including a roller blind mechanism for raising and lowering a window covering fabric and a continuous cord loop extending below the roller blind mechanism; the drive system comprising a motor configured to operate under electrical power to rotate an output shaft of the motor; a driven wheel; an electrically powered coupling mechanism including a gear assembly driven by the output shaft of the motor configured to rotate the driven wheel during rotation of the output shaft of the motor; wherein the driven wheel engages the continuous cord loop to advance the continuous cord loop during rotation of the driven wheel; and wherein the electrically powered coupling mechanism includes an engaged configuration in which rotation of the output shaft of the motor causes rotation of the driven wheel, and a disengaged configuration in which the driven wheel is not rotated by the output shaft of the motor; a controller for the motor and the electrically powered coupling mechanism, wherein at given times during operation of the drive system, the controller is in one of a machine-control state, a manual-operation state, and a user-control state; wherein the electrically powered coupling mechanism is in the engaged configuration when the controller is in the machine-control state or when the controller is in the user-control state, and the electrically powered coupling mechanism is in the disengaged configuration when the controller is in the manual-operation state; and a motion sensor communicatively coupled to the controller for the motor and the electrically powered coupling mechanism, wherein the motion sensor is configured to provide a motion sensor output; wherein the controller for the motor and the electrically powered coupling mechanism is configured to receive the motion sensor output as a monitored variable, and the controller is configured to process the motion sensor output to control the operation of the drive system in the machine-control state.

The embodiments described herein additionally include a drive system for use with a window covering system, the window covering system including a headrail, a mechanism associated with the headrail for spreading and retracting a window covering, and a continuous cord loop extending below the headrail for actuating the mechanism associated with the headrail; the drive system comprising a motor configured to operate under electrical power to rotate an output shaft of the motor; a driven wheel; an electrically powered coupling mechanism including a gear assembly driven by the output shaft of the motor configured to rotate the driven wheel during rotation of the output shaft of the motor; wherein the driven wheel engages the continuous cord loop to advance the continuous cord loop during rotation of the driven wheel; and wherein the electrically powered coupling mechanism includes an engaged configuration in which rotation of the output shaft of the motor causes rotation of the driven wheel, and a disengaged configuration in which the driven wheel is not rotated by the output shaft of the motor; a controller for the motor and the electrically powered coupling mechanism, wherein at given times during operation of the drive system, the controller is in one of a machine-control state, a manual-operation state, and a user-control state; wherein the electrically powered coupling mechanism is in the engaged configuration when the controller is in the machine-control state or when the controller is in the user-control state, and the electrically powered coupling mechanism is in the disengaged configuration when the controller is in the manual-operation state; and a wireless network communication module operatively coupled to the controller and configured for effecting wireless communications with one or more of a building automation system, a hub, and a smart device; wherein the controller for the motor and the electrically powered coupling mechanism is configured to receive one or more inputs, the one or more inputs comprising at least one of a command from the building automation system, a command from the hub, a command from the smart device, data from the building automation system, data from the hub, and data from the smart device; and wherein the controller is configured to process the one or more inputs to control operation of the drive system to effect one or more window covering functions including regulation of lighting, regulation of room temperature, and regulation of window privacy.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
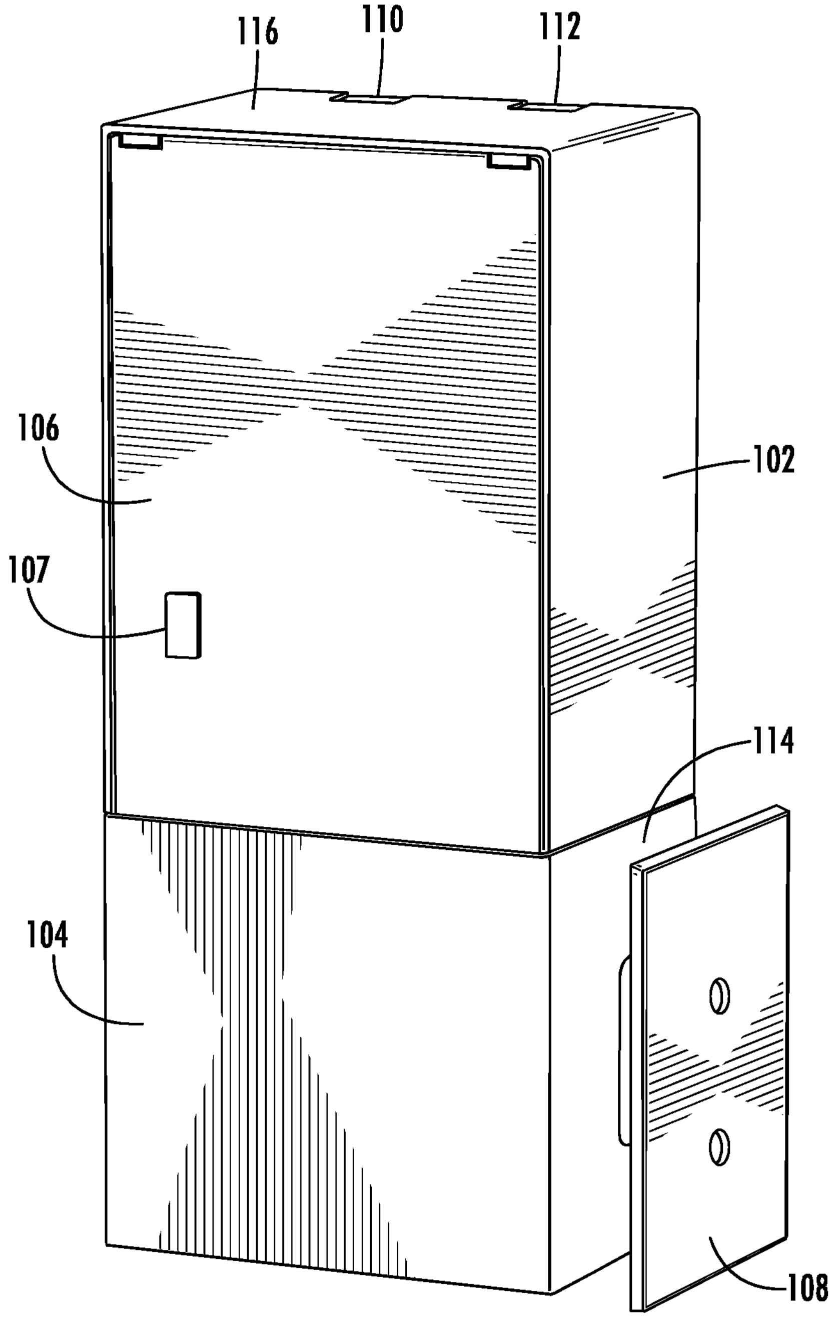
FIG. 1 is an exterior perspective view of a drive system for a window covering system, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The present disclosure describes various embodiments of a motor-operated drive system, for use in combination with a window covering system. As used in the present disclosure, "window covering system" is a system for spreading and retracting a window covering. In an embodiment, the window covering system includes a headrail, and a mechanism associated with the headrail (i.e., a mechanism within the headrail or adjacent the headrail) for spreading and retracting a window covering. In an embodiment, the window covering system includes a continuous cord loop extending below the headrail for actuating the mechanism associated with the headrail, to spread and retract the window covering. As used in the present disclosure, "headrail" is a broad term for the structure of a window covering system including a mechanism for spreading and retracting the window covering.

In the present disclosure, "window covering" includes any covering material that may be spread and retracted to cover a window or other architectural opening using a system continuous cord loop system (i.e., system with a mechanism for spreading and retracting the window covering using a continuous cord loop). Such windows coverings include most shades and blinds as well as other covering materials, such as: roller shades; honeycomb shades; horizontal sheer shades, pleated shades, woven wood shades, Roman shades, Venetian blinds, Pirouette® shades (Pirouette is a trademark of Hunter Douglas N.V., Rotterdam, Germany), and certain systems for opening and closing curtains and drapery. Window covering embodiments described herein refer to blind or blinds, it being understood that these embodiments are illustrative of other forms of window coverings.

As used in the present disclosure, a "continuous cord loop" is an endless loop of flexible material, such as a rope, cord, beaded chain and ball chain. Continuous cord loops in the form of loops of cord are available in various types and ranges of diameter including for example D-30 ($1\frac{1}{8}$"-$1\frac{1}{4}$"), C-30 ($1\frac{3}{16}$"-$1\frac{7}{16}$"), D-40 ($1\frac{3}{16}$"-$1\frac{7}{16}$"), and K-35 ($1\frac{1}{4}$"-$1\frac{1}{2}$"). Additionally, various types of beaded chain and ball chain are commonly used as continuous cord loops for window covering systems. A typical ball chain diameter is 5 mm (0.2 inch). In a common window covering system design, the continuous cord loop includes a first loop end at the headrail engaging a mechanism associated with the headrail for spreading and retracting the window covering, and includes a second loop end remote from the headrail. Continuous cord loops come in different cord loop lengths, i.e., the length between the first loop end and the second loop end, sometimes rounded off to the nearest foot. In one embodiment, e.g., in a roller blinds system, the continuous cord loop extends between the headrail and the second loop end, but does not extend across the headrail. In this embodiment, the first loop end may wrap around a clutch that is part of the mechanism spreading and retracting the blind. In another embodiment, e.g., in a vertical blinds system, a segment of the continuous cord loop extends across the headrail.

The continuous cord loop system may spread and retract the window covering by raising and lowering, laterally opening and closing, or other movements that spread the window covering to cover the architectural opening and that retract the window covering to uncover the architectural opening. Embodiments described herein refer to raising and lowering blinds, it being understood that that these embodiments are illustrative of other motions for spreading and retracting window coverings. In one embodiment of continuous cord loop system, the continuous cord loop includes a rear cord and a front cord, and pulling down the rear cord lowers (spreads) the blind. In this embodiment, pulling down the front cord raises (retracts) the blind. As used in the present disclosure, to "advance" the continuous cord loop means to move the continuous cord loop in either direction (e.g., to pull down a front cord of a continuous cord loop or to pull down a back cord of a continuous cord loop). In an embodiment, the blind automatically stops and locks in position when the continuous cord loop is released. In an embodiment, when at the bottom of the blind, the rear cord of the continuous cord loop can be used to open any vanes in the blind, while the front cord can be used to close these vanes.

In an embodiment, the continuous cord loop extends below the headrail in a substantially vertical orientation. As used in the present disclosure, "substantially vertical orientation" does not require that the continuous cord loop be precisely vertical. Orientations of the continuous cord loop that significantly deviate from vertical can cause added friction in operation and have been observed to cause mechanical problems in the continuous cord loop system such as tangling, binding, and excessive wear or breakage. In addition, extreme deviations from vertical orientation of the continuous cord loop may present a safety hazard.

Turning to FIG. 1, as seen in an exterior perspective view a drive system 100 includes a housing 102 with a lower housing 104 and an upper housing 106. A power switch 107 is located at the upper housing 106. The top side 116 of housing 102 has channel apertures including a first channel aperture 110 and a second channel aperture 112, located at the far edge of top side 116. Each of these channel apertures is an opening in the housing 102 through which a continuous cord loop, not seen in this view, may extend. Housing 102 further includes a bracket 108 mounted on side 114 of the lower housing 104. (As used in the present disclosure, a "side" of the housing means a face or surface, which may include e.g., flat faces of housings in the form of polyhedra such as the housing 102, and curved surfaces of housings in the form of non-polyhedra). The drive system 100 provides an example of various mounting configurations and continuous cord loop routing configurations, in accordance with the present technology. In this embodiment, the channel apertures 110, 112 are located at the top, far edge of the housing, while the mounting bracket is located at a lower housing on a different vertical side 114 of the housing than the far side (not seen) that borders on the channel apertures.

Figure 2:
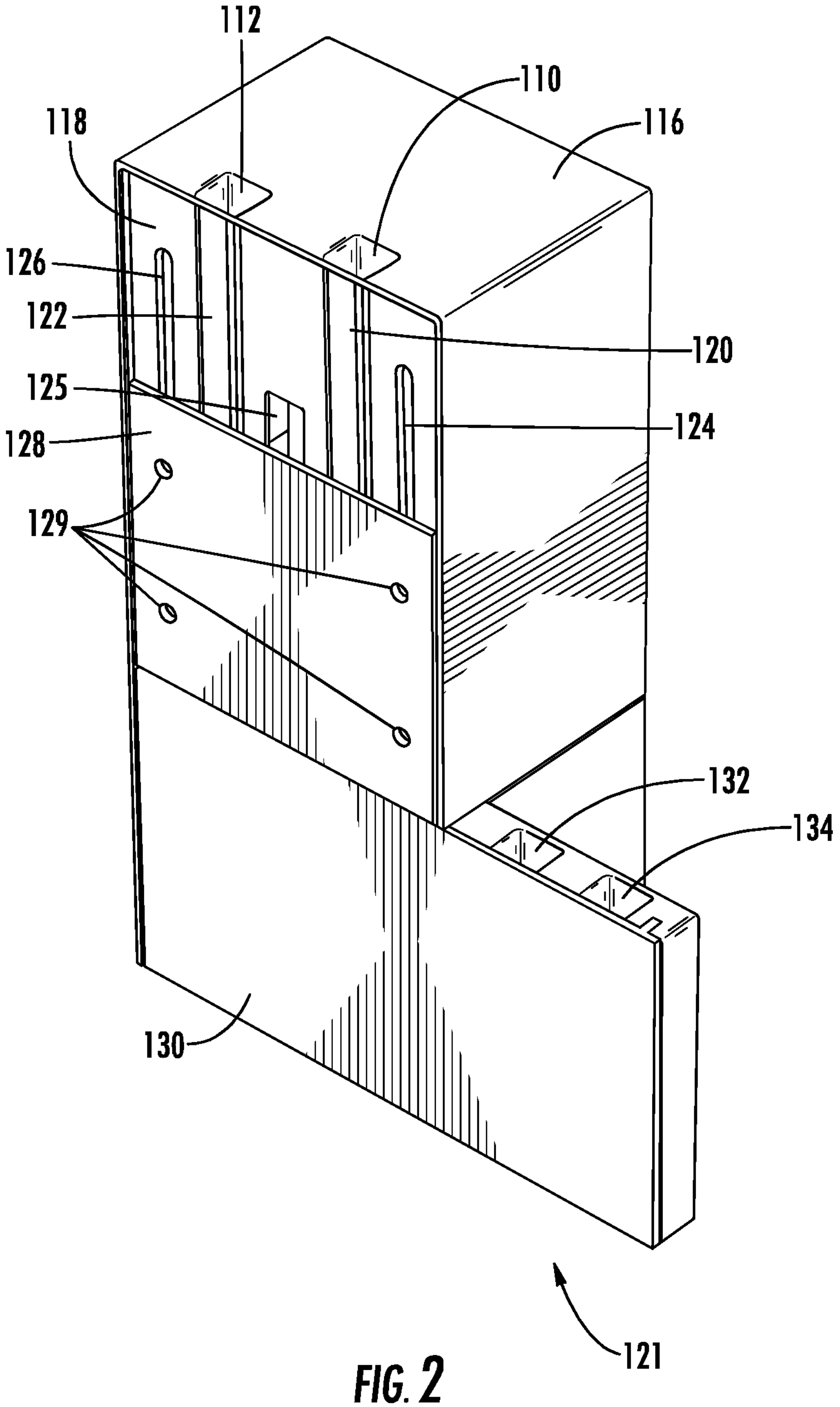
FIG. 2 is an exterior perspective view of a drive system for a window covering system, according to another embodiment.

FIG. 2 is an exterior perspective view of another drive system configuration 121, viewed from a side 118 that borders in channel apertures 110, 112. Drive system 121 includes at side 118 a first channel 120 (terminating at channel aperture 110) and a second channel 122 (terminating at channel aperture 112). Other features at side 118 include a centrally located tension adjustment slot 125, a first mounting slot 124, and a second mounting slot 126. In this configuration, the drive system 121 includes a bracket 128 at a lower portion of the upper housing, this bracket including four bracket apertures 129. Drive system configuration 121 also includes a channel system 130 attached to the lower housing. The channel system 130 includes a first channel aperture 132 and a second channel aperture 134. As used in the present disclosure, the channel system includes one or more channels that guide the continuous cord loop within the drive system. In an embodiment, the one or more channels of the channel system are defined by the drive system housing. In an embodiment, the one or more channels of the channel system terminate at one or more channel apertures. In an embodiment, the channel system redirects the continuous cord loop.

Figure 3:
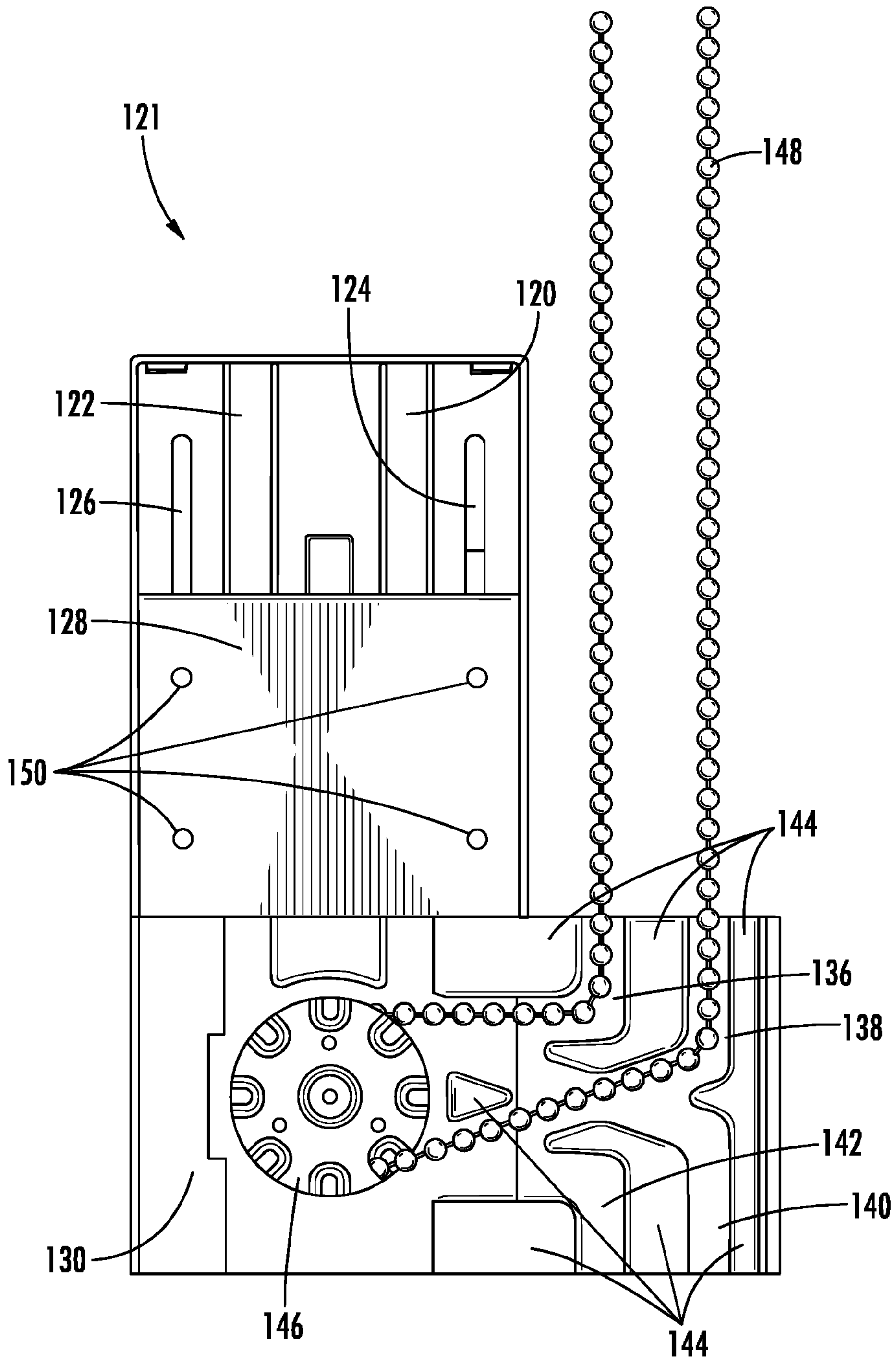
FIG. 3 is an interior elevation view of a drive system for a window covering system, according to the embodiment of FIG. 2.

FIG. 3 is an interior elevation view of the drive system 121 of FIG. 2, with a continuous cord loop (beaded chain 148) secured within the channel system 130. A lid of channel system 130 has been removed to reveal driven wheel 146, and an interior structure of channel system 130. Ribs 144 of channel system 130 define interior channels for routing continuous cord loop 148. In this configuration, the continuous cord loop or beaded chain 148 passes through a first channel 136, which terminates at channel aperture 132 (FIG. 2) and a second channel 138, which terminates at channel aperture 134. The interior channels of channel system 130 redirect the continuous cord loop 148 engaged by driven wheel 146. Thus, while driven wheel 146 is centrally located within the main body of housing 102 (FIG. 1), the channel system 130 redirects the continuous cord loop 148 so that, as seen in this view, it extends upwardly to the right of housing 102. FIG. 3 may be compared with other drive system configurations such as the drive system configuration 151 shown in FIG. 7, in which the continuous cord loop 148 once mounted would be routed upwardly through channels 120, 122 to extend directly above the main housing 102.

As used in the present disclosure, the drive system may "redirect" the continuous cord loop by changing the direction of the continuous cord loop within a given embodiment, as in the change in direction seen in FIG. 3. Alternatively or in addition, the drive system may "redirect" the continuous cord loop by changing the direction in which the continuous cord loop extends from the drive system. In one embodiment, the user may change the direction in which the continuous cord loop extends from the drive system housing by changing the configuration of the drive system housing without changing the basic orientation of the housing; e.g., changing the configuration from that of FIG. 3 to that of FIG. 7. In another embodiment, the user may the user may change the direction in which the continuous cord loop extends from the drive system by changing the basic orientation of the housing. For example, the user may change the orientation from that of FIG. 7, in which the continuous cord loop extends from the top of the housing, by turning the housing on its side so that the continuous cord loop extends from one or more opening at a side of the housing (not shown in FIG. 7). In another example, the user may change the orientation from that of FIG. 7, by vertically inverting the housing so that the continuous cord loop extends from one or more opening at the bottom of the housing (not shown in FIG. 7).

Figure 4:
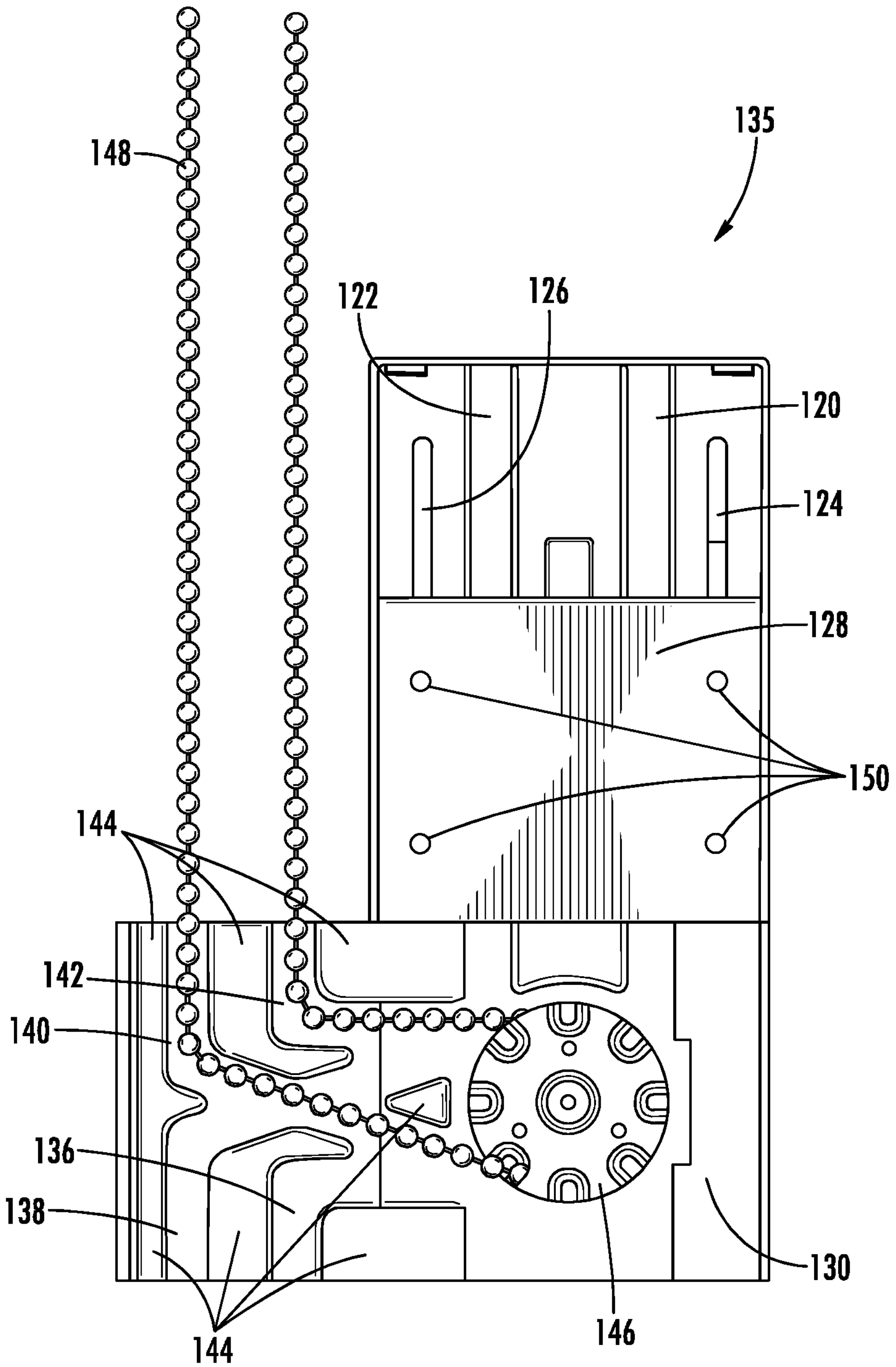
FIG. 4 is an interior elevation view of a drive system for a window covering system, according to an embodiment.

FIG. 4 shows an interior elevation view of a further alternative drive system configuration 135 including the channel system 130. In configuration 131, channel system 130 has been inverted 180° and attached to main housing 102 to extend to the left of the housing rather than to the right of the housing. In this configuration, continuous cord loop (beaded chain) 148 is routed through channels 140 and 142 rather than channels 136, 138. In this configuration, the channel system 130 redirects the continuous cord loop 148 so that, as seen in this view, it extends upwardly to the left side of housing 102.

Figure 5A:
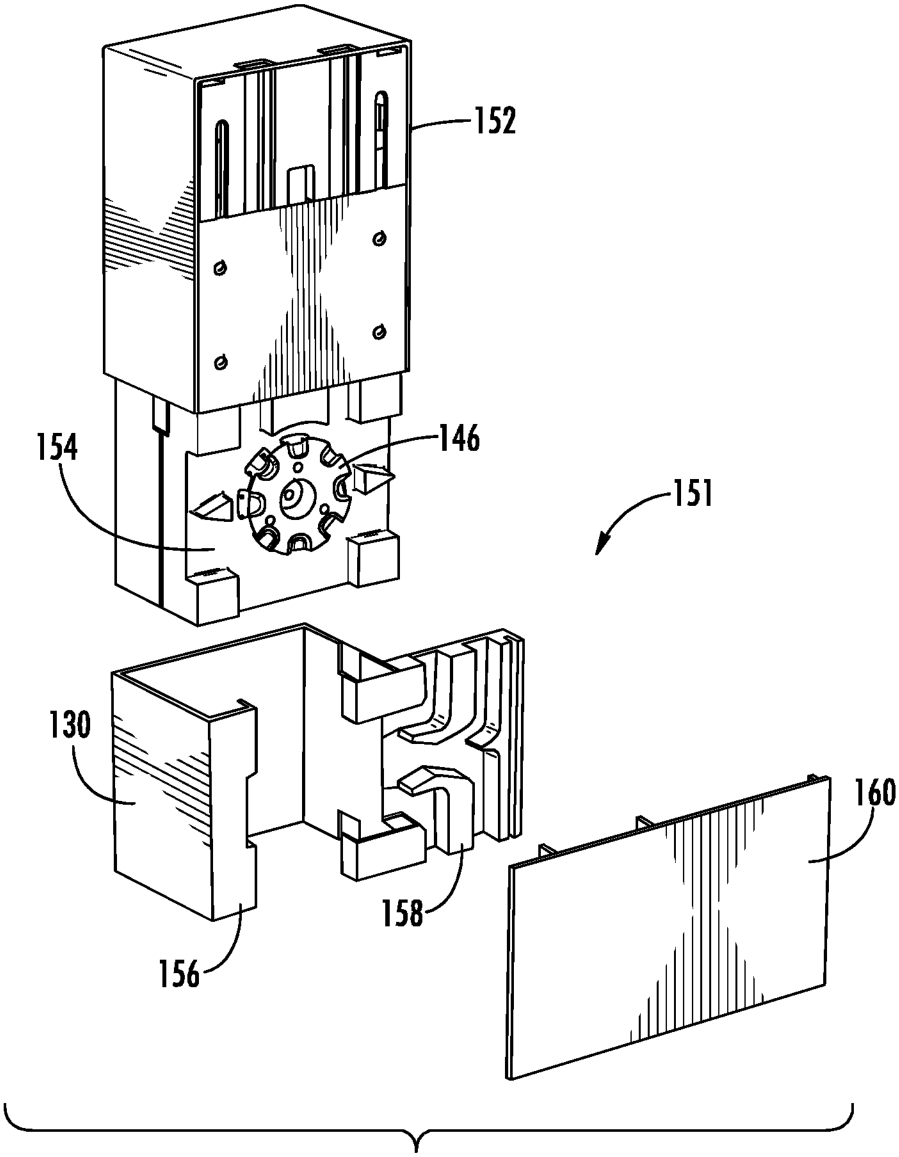
FIG. 5A is a perspective view of disassembled assemblies of a drive system for a window covering system, according to an embodiment.

FIG. 5A is a perspective view of disassembled assemblies of a drive system 151 generally corresponding to the configuration of drive system 121 in FIGS. 2, 3. An upper drive assembly 152 of drive system 151 includes a driven wheel section 154 that includes driven wheel 146. Channel system 130 is here shown as a three dimensional structure including a driven wheel redirect casing 156 and an inner channel section 158. The driven wheel redirect casing 156 is a bilaterally symmetric case designed to fit around the driven wheel section 154 of upper drive assembly 152. By virtue of its symmetric design, the driven wheel redirect casing 156 may be inverted 180° and fitted around driven wheel section 154 with inner channel section 158 either facing to the right, or facing to the left. A channel system cover 160 is joined to channel system 130 to cover the interior channels. The assembled driven wheel section 154, inner channel section 158, and channel system cover 160 collectively define the inner channels of channel system 130.

Figure 5B:
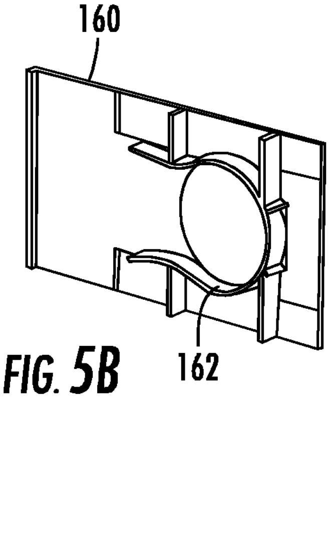
FIG. 5B is a perspective view of the inner face of channel system lid, according to the embodiment of FIG. 5A.

FIG. 5B is a perspective view of the inner face of channel system lid 160 from the drive system 151 of FIG. 5A. Channel system lid 160 includes a driven wheel redirect rim 162 that serves as one of the structures defining and protecting the inner channels of channel system 130. In the fully assembled drive system 151, channel system redirect rim 162 surrounds the driven wheel 146 and the continuous cord loop 148 engaged by driven wheel 146 (cf. FIG. 3).

Figure 6:
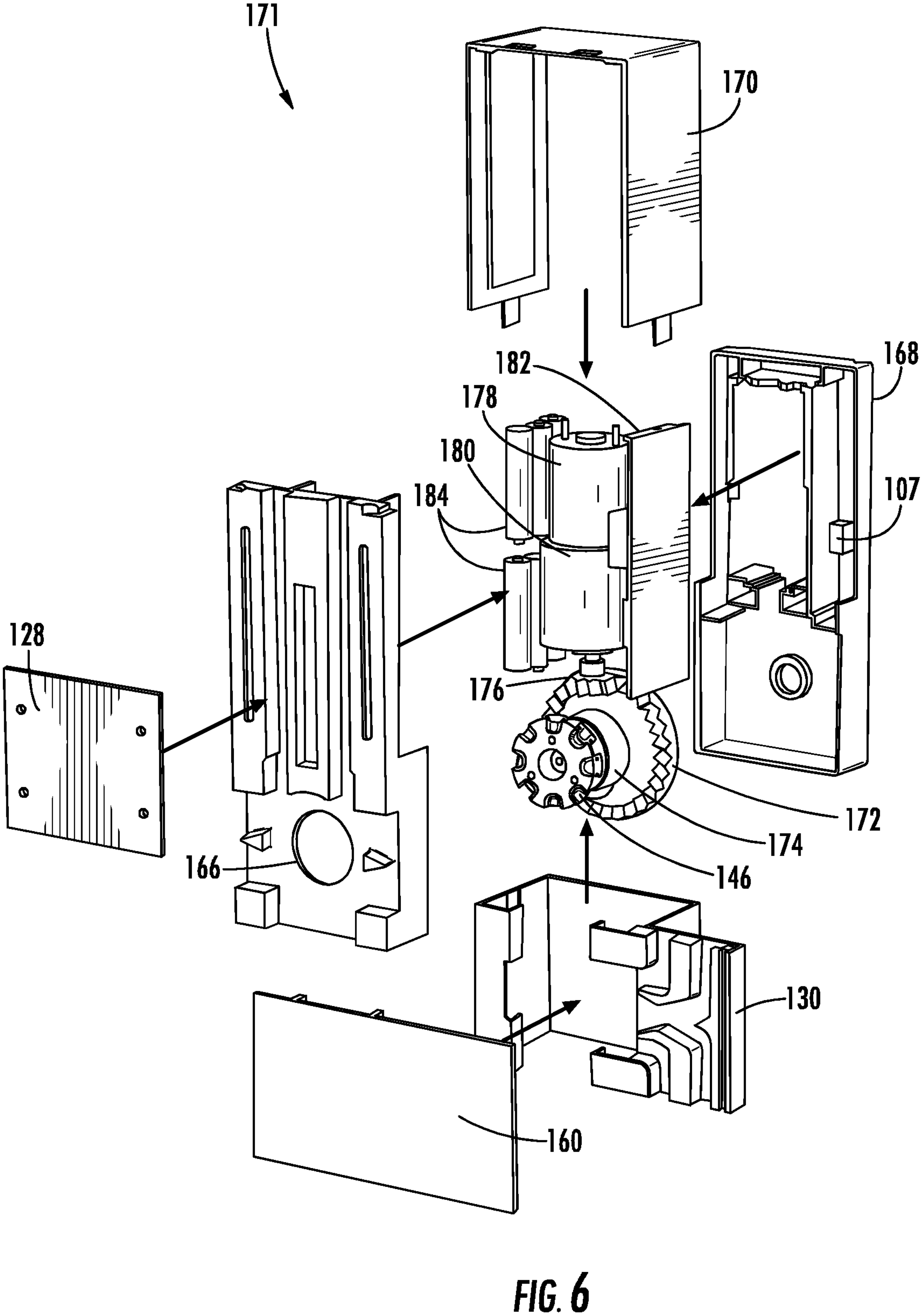
FIG. 6 is an exploded view of continuous cord loop drive system components, according to an embodiment.

FIG. 6 is an exploded view of components of a drive system 171, including structural parts and components of the motor drive system. Structural components include female body 164, male body 168, and hat 170. Female body 164 includes a driven wheel aperture to receive driven wheel 166. Female body 164 may be configured similarly to upper drive assembly 152 (FIG. 5A) and may be fitted to channel system 130 and channel system lid 160 as previously described. Female body 164 also may include the various features and structures described above for the drive system 121 of FIG. 2, such as mounting bracket 128. In an embodiment, female body 164, male body 168, and hat 170 are fitted together to surround and protect the various working components of the drive system 171, with hat 170 covering these structures from above.

Working components of a motor drive train from the drive system 171 of FIG. 6 include in sequence a DC motor 178, planetary gear 180, hypoid pinion 176, face gear 172, clutch 174, and driven wheel 146. Other operational components of the drive system include circuit board 182 and batteries 184.

Figure 10:
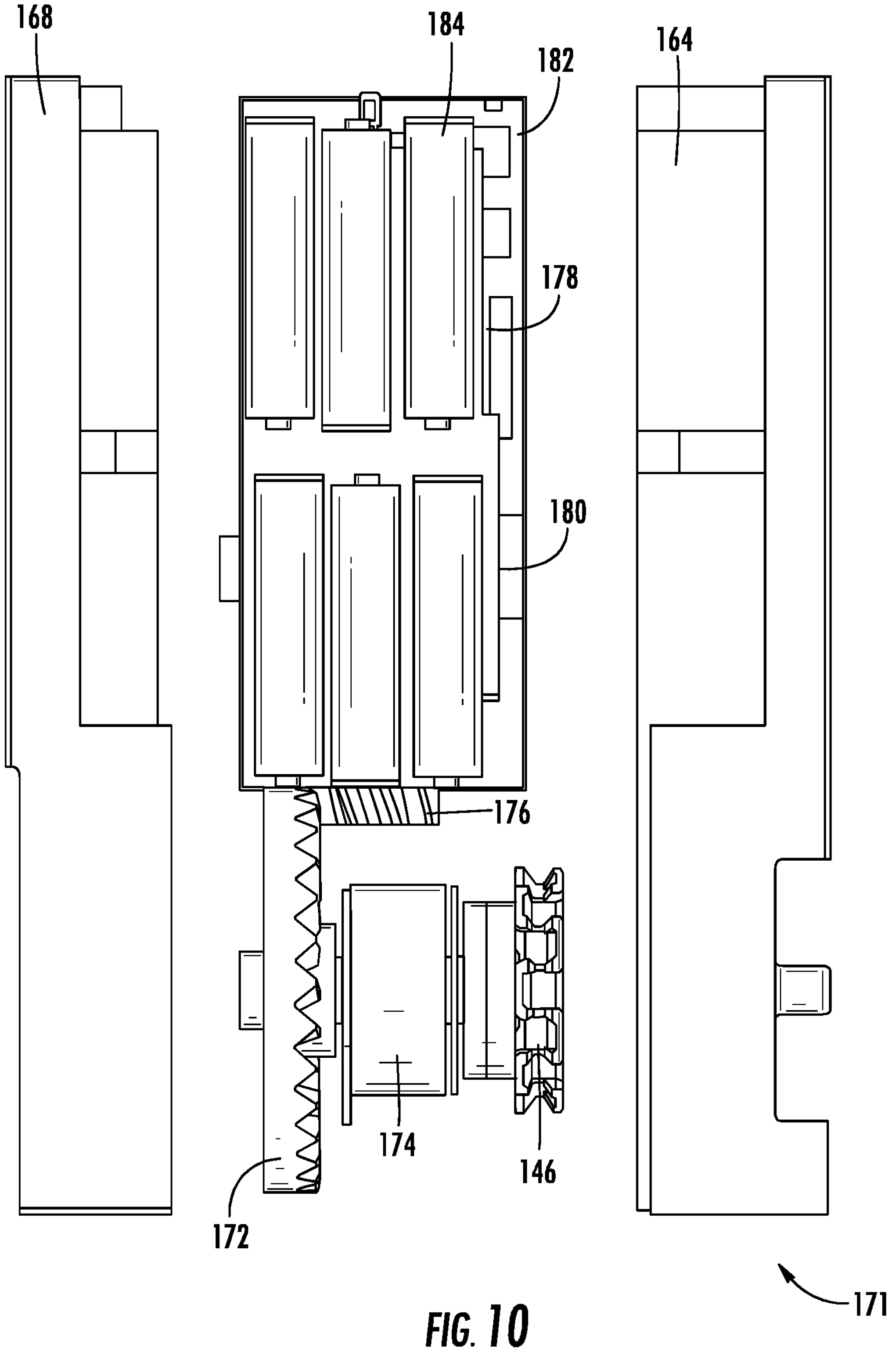
FIG. 10 is an elevation view of disassembled assemblies of a drive system for a window covering system, according to the embodiment of FIG. 6.

FIG. 10 is an elevation view of structural components and assembled working components from the drive system 171 of FIG. 6, as seen from one side. Male body 168 and female body 164 are configured to envelop the drive train and other operational components of drive system 171, but are here shown separated from these components. DC motor 178, under power and control from circuit board 182 and batteries 184, has a rotating output shaft. Batteries 184 may for example be nickel-metal hydride (NiMH) batteries, or lithium-ion polymer (LiPo) batteries. A multi-stage gear assembly includes planetary gear 180 and hypoid gear 176 in line with the motor output shaft, and face gear 172 driven by hypoid gear 176. Face gear 172 is coupled to driven wheel 146 by clutch 174. Clutch 174 is a coupling mechanism that includes an engaged configuration in which rotation of the output shaft of the motor 178 (as transmitted by the multi-stage gear assembly) causes rotation of the driven wheel 146; and a disengaged configuration in which the driven wheel 146 is not rotated by the output shaft of the motor. In an embodiment, clutch 174 is an electrically operated device that transmits torque mechanically, such as an electromagnetic clutch. In another embodiment, clutch 174 is a mechanical-only clutch that does not operate under electrical power.

The drive train components of drive system 171 in FIGS. 6 and 10 are merely illustrative, and a wide variety of other driving components and power-transmission components may employed in the present drive system. For example, the gear assembly may include helical gears, work drives (including worm gears), hypoid gears, face gears, and crown gears, including various combinations of these and other power transmission components. A face gear coupled to driven wheel 146 may be employed, for example, in combination with a spur, helical, or conical pinion.

In lieu of clutch 174, other mechanisms may be employed for engaging and disengaging the electrical motor drive and the driven wheel. Various power transmission mechanisms, such as cam mechanisms, are known alternatives to clutches for selectively engaging and disengaging a rotating input device (motor drive system) and a driven output device (driven wheel). Additional power transmission mechanisms (which may in some cases be considered clutch mechanisms) for engaging and disengaging the electrical motor drive and the driven wheel include, for example, micromotors, solenoids, and synchromesh mechanisms.

Figure 7:
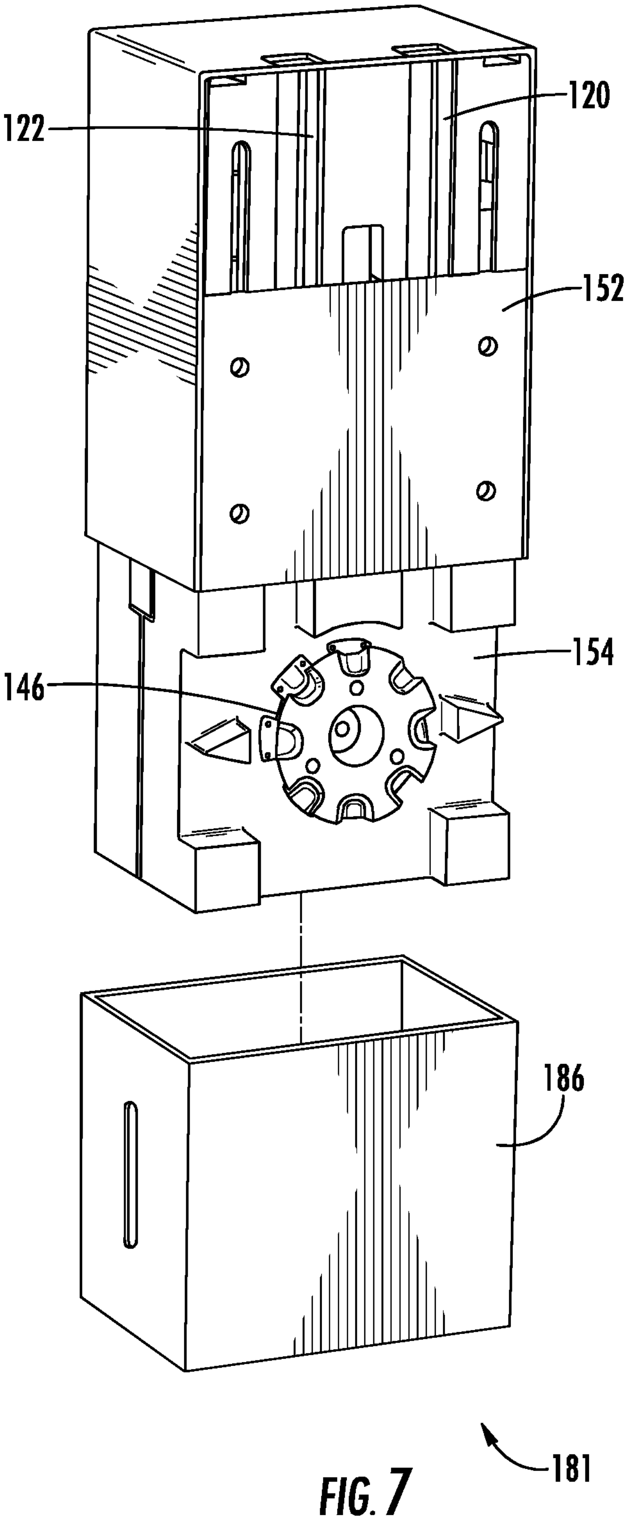
FIG. 7 is a perspective view of disassembled assemblies of a drive system for a window covering system, according to an embodiment.

FIG. 7 shows in perspective parts of a drive system 181 including upper drive assembly 152 and base casing 186. Base casing 186 surrounds and protects the driven wheel section 154, including driven wheel 146, of upper drive assembly 152. However, in contrast to the embodiment of FIG. 5A, base casing 186 does not serve as a channel system to redirect a continuous cord loop to one side or the other of drive system 181. Rather, drive system 181 is configured so that a continuous cord loop (not shown) engaged by driven wheel 146 is routed through the first channel 120 and second channel 122 to extend vertically directly above the drive system 181.

Figure 8:
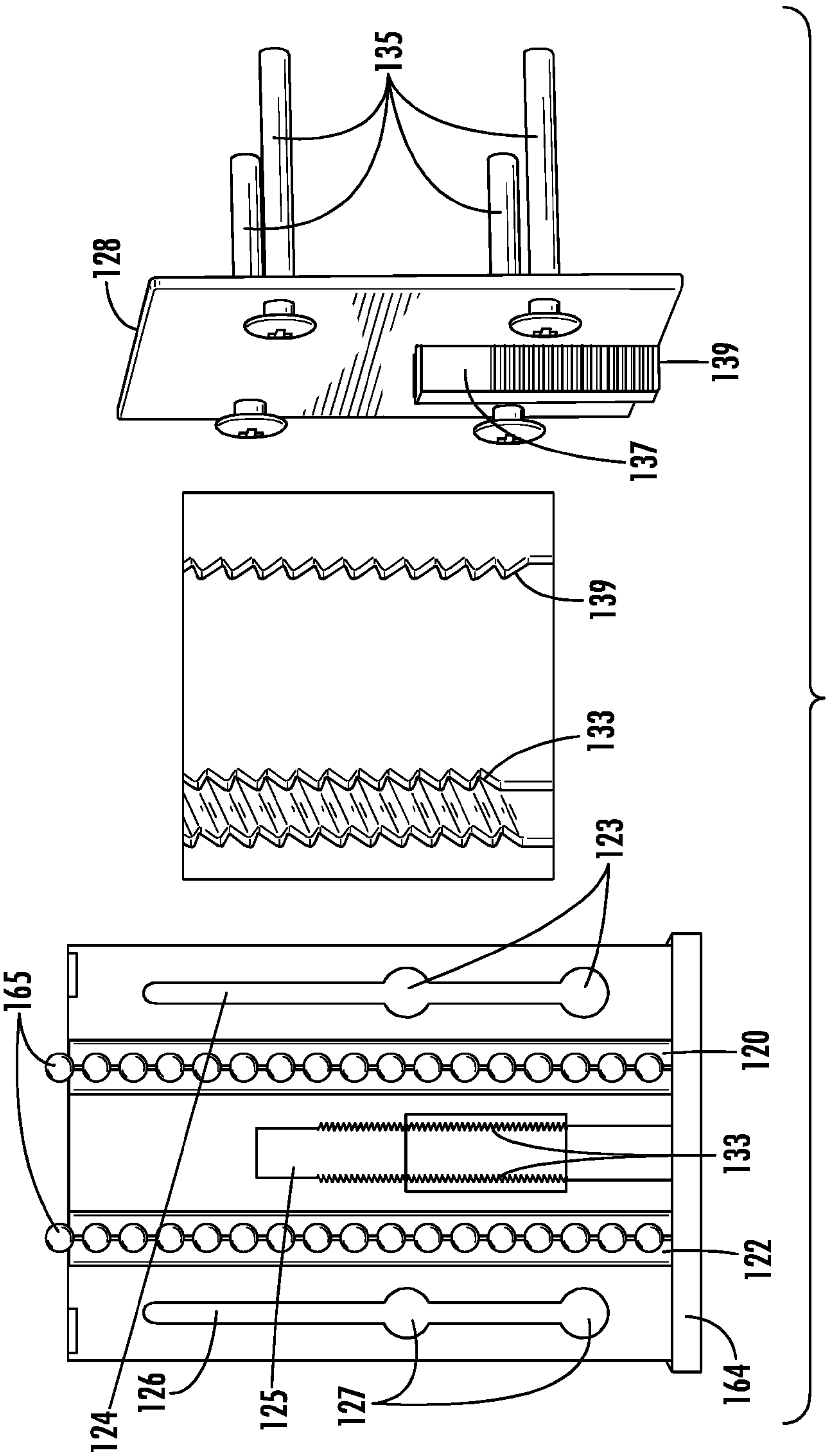
FIG. 8 is a composite of perspective views of components of a drive system for a window covering system, and close-up perspective views of teeth in these components, according to an embodiment.
Figure 9:
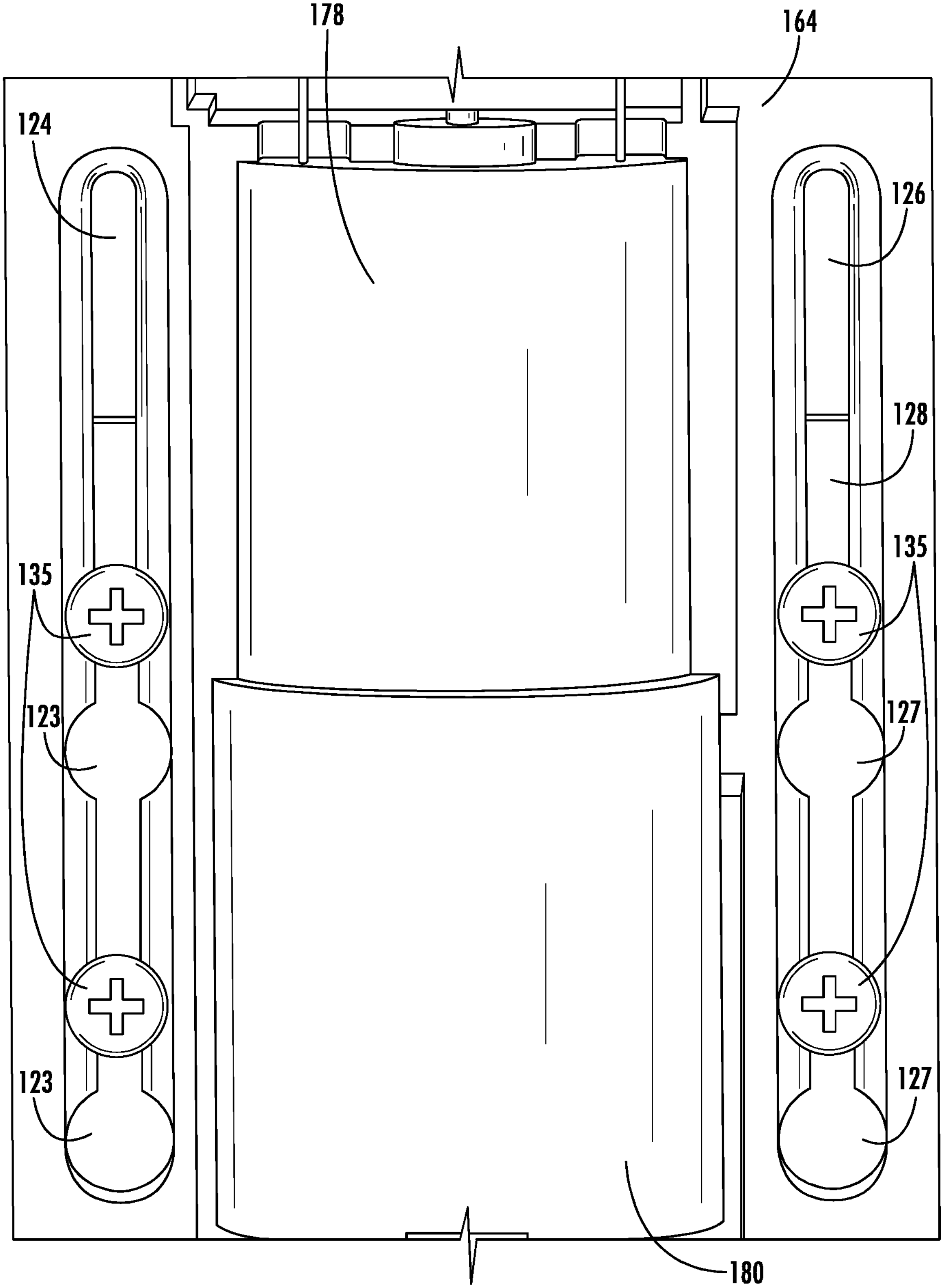
FIG. 9 is an interior perspective view of components of a drive system for a window covering system during installation of the drive system, according to the embodiment of FIG. 8.

FIGS. 8 and 9 show selected components of a drive system (such as the drive system 181) during an exemplary procedure for installing of the drive system. In a first step the user selects a suitable mounting bracket for the particular installation (as discussed below with reference to FIGS. 11-17). In the embodiment of FIGS. 8 and 9, the user selects bracket 128, which is configured to be attached to female body 164 (see FIG. 6). The user mounts bracket 128 to a desired wall or window wall frame location, while allowing the screws 135 to protrude slightly from the bracket, as seen at the right side of the composite view of FIG. 8.

The user also may select structural components of the drive system appropriate to a desired configuration of the continuous cord loop. In the embodiment of FIGS. 8 and 9 the user selects the drive system configuration 181 of FIG. 7, in which the installed continuous cord loop extends vertically directly above the drive system. The user inserts the ball chain 165 through first and second channels 120, 122 and attaches the ball chain to the driven wheel 146 (not seen in FIGS. 8 and 9). The user then slidably attaches the base casing 186 (FIG. 7) to the upper drive assembly including female body 164, to secure the ball chain. Alternatively, if the user were to select a channel system 130 for one of the configurations of FIGS. 3 and 4, at this step the user would install the ball chain through the channels in channel system 130, rather than through female body 164.

At the next step, the user mounts the drive system device onto the bracket 164. As seen in the left view of FIG. 8, first mounting slot 124 includes keyways 123, and second mounting slot 126 includes keyways 127. The user inserts the heads of screws 135 (protruding from bracket 128) into keyways 123, 127 to enter female body 164. The user then pulls down the drive system device to apply tension to the ball chain 165, causing threads of screws 135 to travel upwardly within mounting slots 124, 126, as seen in an interior view of female body 164 in FIG. 9. Bracket 128 includes a rectangular bar 137, which is inserted into tension adjustment slot 125 at the center of female body 164 when the user insert screws 135 into female body 186. Tension adjustment slot 125 includes teeth 133 at its inner walls, and bracket 128 includes complementary teeth 139. The close-up view at the center of FIG. 8 shows the tension adjustment slot teeth 133 from two different perspectives. As the user pulls down, bracket teeth 139 click into tension adjustment slot teeth 133. This ratchet mechanism prevents the drive system device from rising back, and ultimately locks or secures the ball chain 165 within the device at a desired tension.

Thus, during installation, the user may lock the continuous cord loop into the drive system while providing an appropriate tension of the continuous cord loop. Other locking mechanisms may be employed in the drive system to prevent the continuous cord loop from moving out of place during operation of the drive system. In an embodiment, not illustrated here, the device includes a user-activated release mechanism to disengage the locking mechanism. Activation of this release mechanism would loosen the tension of the continuous cord loop, permitting the device to be moved in a reversal of the installation process, and removed from the mounting bracket.

Securing the continuous cord loop within the present motor drive system promotes safety, by preventing strangulation of small children and pets.

The embodiment of FIGS. 8 and 9 provides one example of a procedure for installing a continuous cord loop in a drive system in accordance with the present disclosure. Numerous variations of this installation procedure are possible, e.g., in the configuration of the drive system, in the mounting of the drive system adjacent the architectural opening, in the path of the continuous cord loop both internal and external to the device, in the designs of continuous cord loop and driven wheel, and in the mechanism for locking the continuous cord loop to the driven wheel.

FIGS. 11-17 show various drive system installations for use in combination with an installed window covering system including continuous cord loop control. The drive system may be installed for use with a previously installed window covering system, or the drive system and window covering system may be installed together. These figures illustrate the flexible design of the present motor drive system, which may be installed in different configurations of the motor drive system, and mounted in different locations and orientations, depending on the layout of a particular architectural opening. In an embodiment, the flexible mounting arrangements enable the user to mount the motor drive system to a desired wall or window wall frame location with continuous cord loop extending below the headrail of a window covering system in a substantially vertical orientation. In an embodiment in which the continuous cord loop includes a rear cord and a front cord extending below the window covering system, the flexible mounting arrangements ensure that when mounting the drive system, the motor drive system will receive the continuous cord loop in that same orientation. Additionally, the drive system can be mounted with the continuous cord loop at a distance from the wall and from the blinds fabric or other window covering, as are generally desirable.

Figure 11:
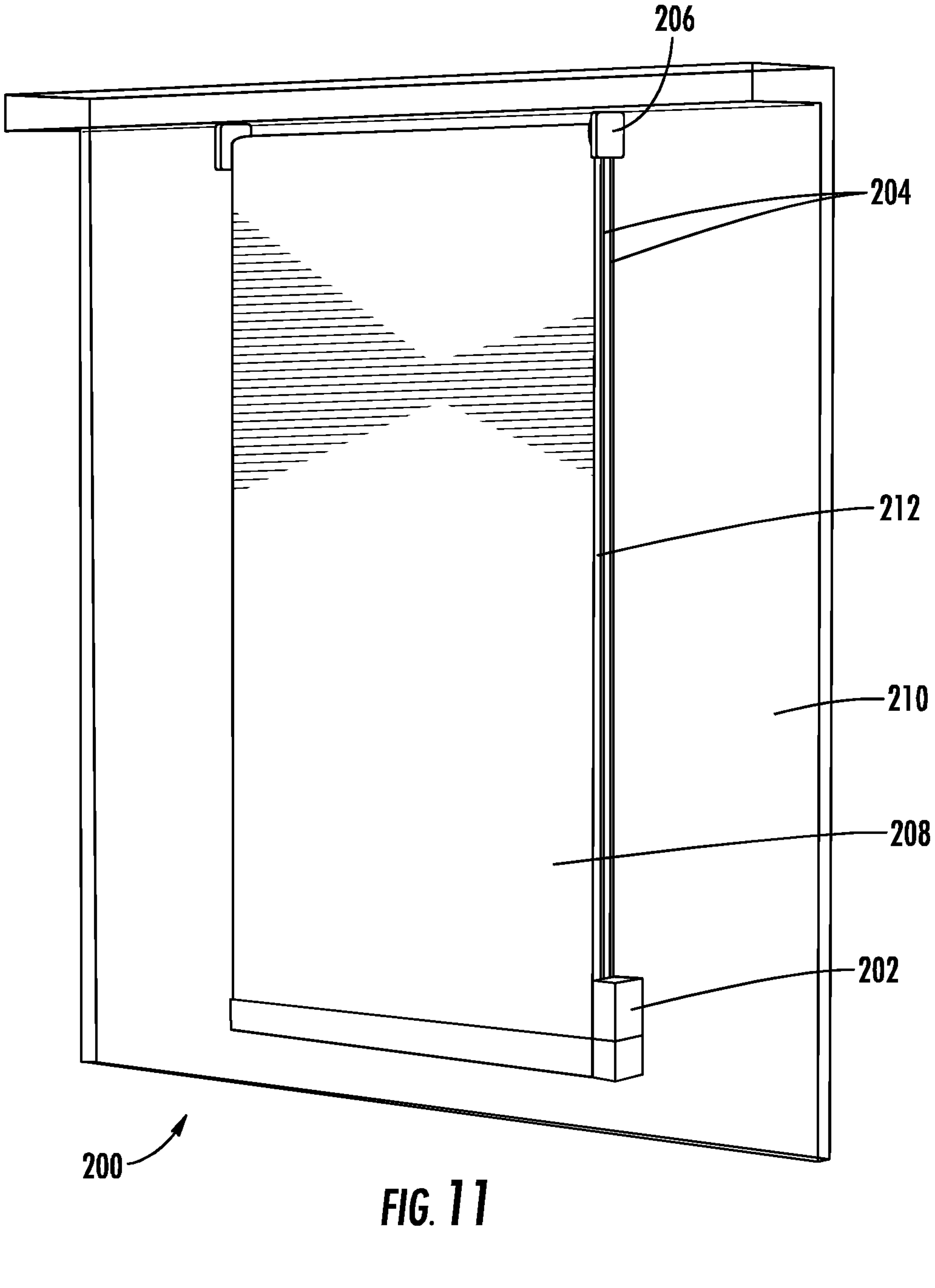
FIG. 11 is a perspective view of a window covering system with a drive system installed on a flat wall, according to an embodiment.

FIG. 11 is a perspective view of a window covering system installation 200 with drive system mounted on a flat wall. Drive system 202 is mounted to the flat wall 210 at the right side, bottom of window 212. Continuous cord loop 204 extends substantially vertically below the headrail 206 of a window covering system to the drive system 202. The window covering system 200 is shown with the window covering, fabric 208, in a spread or lowered configuration.

Figure 12:
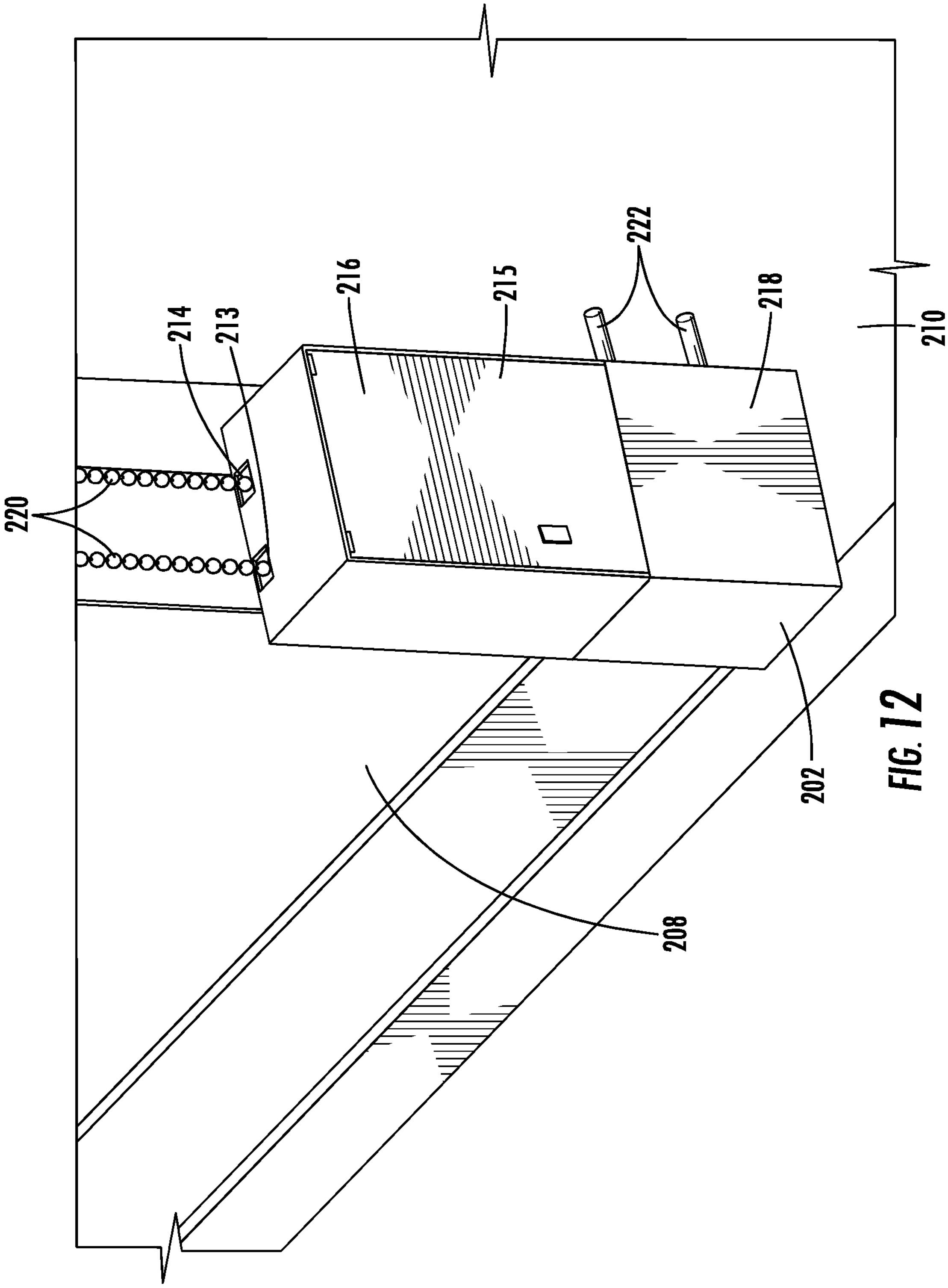
FIG. 12 is a perspective view of an installed drive system for a window covering system, according to the embodiment of FIG. 11.

FIG. 12 shows in perspective the drive system 202 of window covering system 200. Housing 215 includes an upper housing 216 and lower housing 218, including screws 222 mounting the system to flat wall 210. In an embodiment, the drive system may be mounted to the flat wall using a mounting bracket 108 in the configuration shown at 100 in FIG. 1. Drive system 202 includes at its top side, first channel aperture 213 and second channel aperture 214. Front and rear cords of ball chain 220 extend vertically above housing 215 through channel apertures 213, 214. In an embodiment, drive system 202 may have an internal configuration as shown in FIG. 7.

In a variation of the embodiment of FIGS. 11 and 12 not shown, the drive system is mounted at the flat wall 210 at the left side, bottom of window 212 rather than the right side, and the mounting configuration shown in FIG. 12 is reversed so that the channel apertures 213, 214 face to the right side, rather than the left side, of the device.

Figure 13:
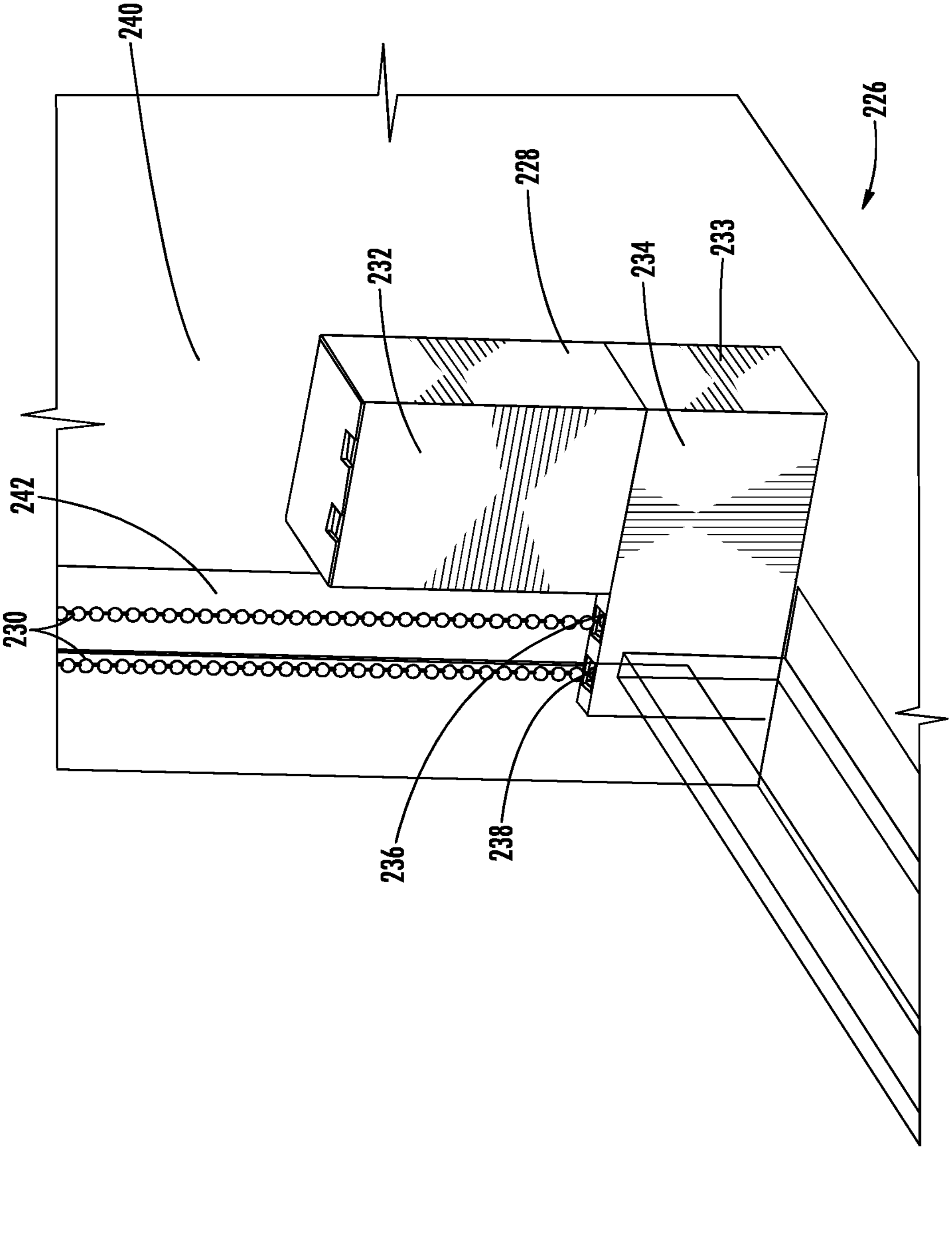
FIG. 13 is a perspective view of an installed drive system for a window covering system in a narrow recess wall frame installation, according to an embodiment.

FIG. 13 shows in perspective a drive system 226 installed in a narrow recess wall frame, including outer wall 240 and inner wall (or inner wall frame) 242. In this configuration, the drive system housing 228 includes an upper housing 232 and lower housing 234, to which is attached channel system 234. Ball chain 230 extends from first channel aperture 236 (the front cord of the ball chain) and second channel aperture 238 (the rear cord of the ball chain). In an embodiment, the configuration of drive system 226 with channel system 234 enables the continuous cord loop (ball chain 230) to extend substantially vertically in the narrow recess wall frame installation. In an embodiment, drive system 226 may have an internal configuration as shown in FIG. 4.

Figure 14:
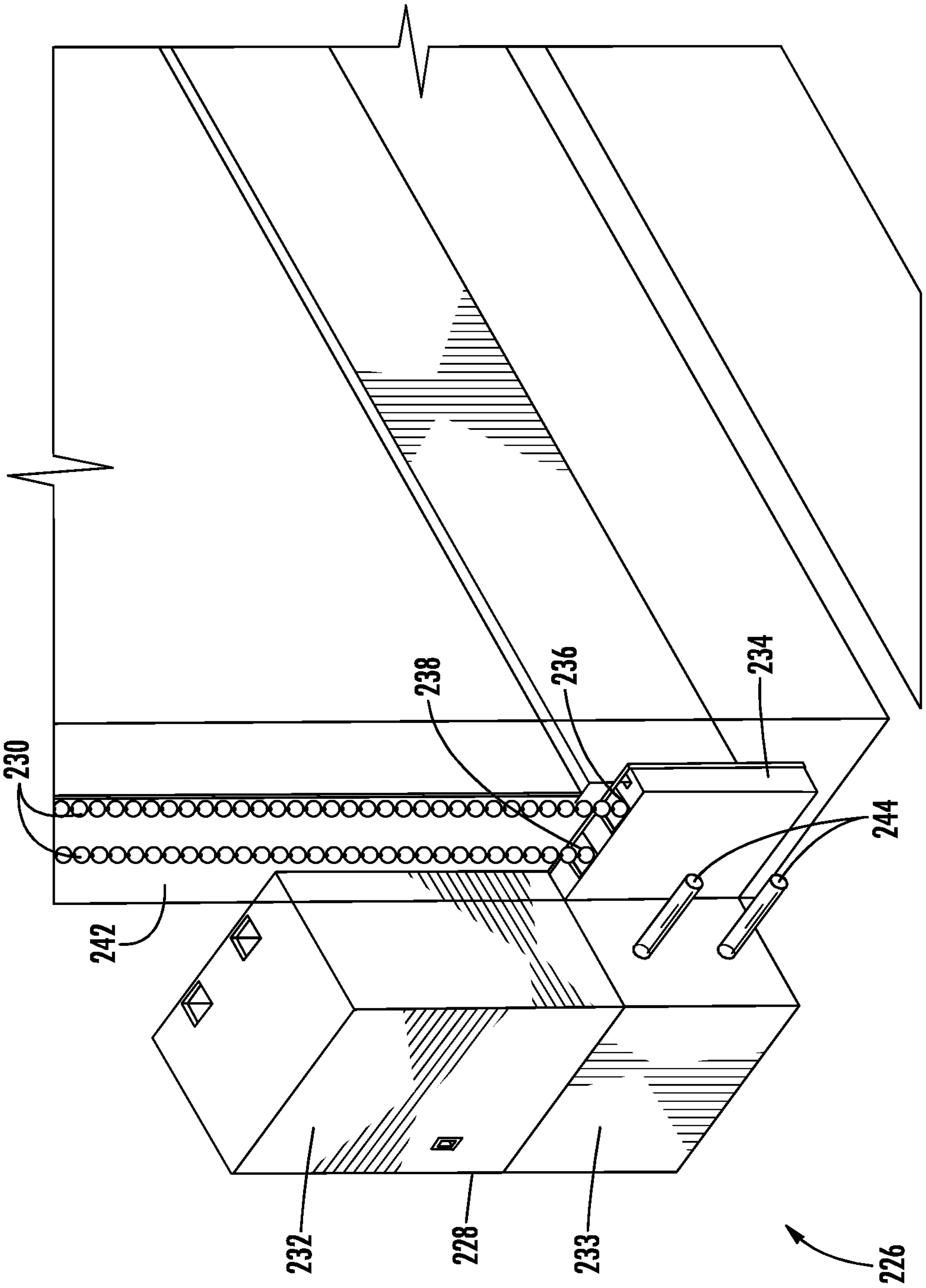
FIG. 14 is a phantom perspective view of an installed drive system from the interior of a narrow recess wall frame installation of a window covering system, according to the embodiment of FIG. 13.

FIG. 14 shows the drive system 226 as viewed from an interior perspective of the narrow recess wall frame installation, seen in phantom. Because of the narrow width of the inner wall (or inner wall frame) 242, drive system 226 is mounted on the outer wall 240 using screws 244 at lower housing 234. Drive system is mounted to outer wall 240. In another embodiment, the drive system 226 may be mounted to the flat wall using a mounting bracket (cf. FIG. 1) at lower housing 234.

Figure 15:
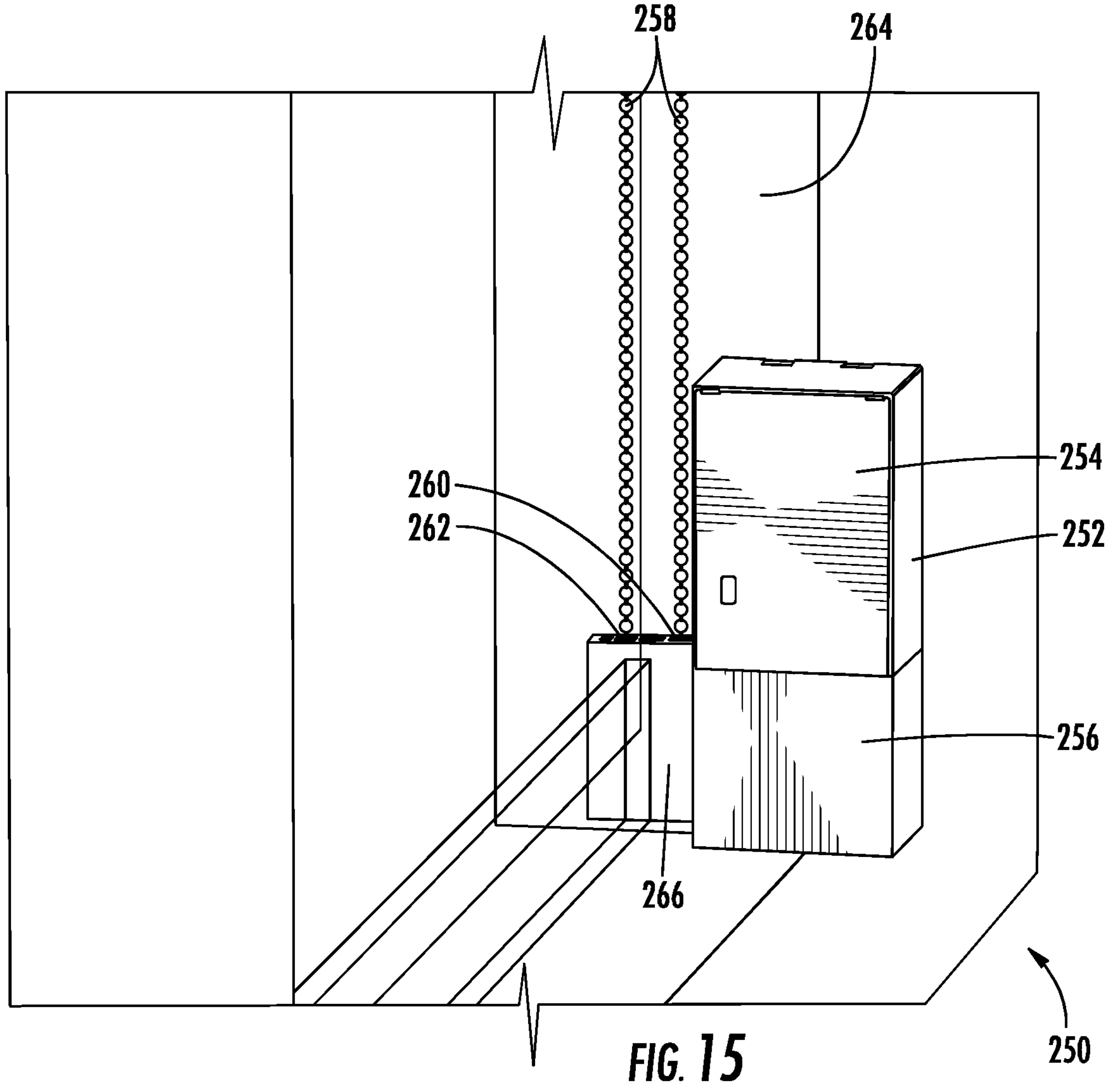
FIG. 15 is a perspective view of an installed drive system for a window covering system in a medium-depth recess wall frame installation, according to an embodiment.

FIG. 15 shows in perspective a drive system 250 installed in a medium-depth recess wall frame 264. Housing 252 includes upper housing 254 and lower housing 256. Channel system 266 is attached to lower housing 256. A ball chain 258 extends from first channel aperture and second channel aperture 260 of channel system 266. In an embodiment, drive system 250 may have an internal configuration as shown in FIG. 3. In an embodiment, drive system 250 is mounted to medium-depth recess inner wall frame 264 using screws at two of the four mounting apertures 250 seen in FIG. 3, i.e., the two right-hand mounting locations.

Figure 16:
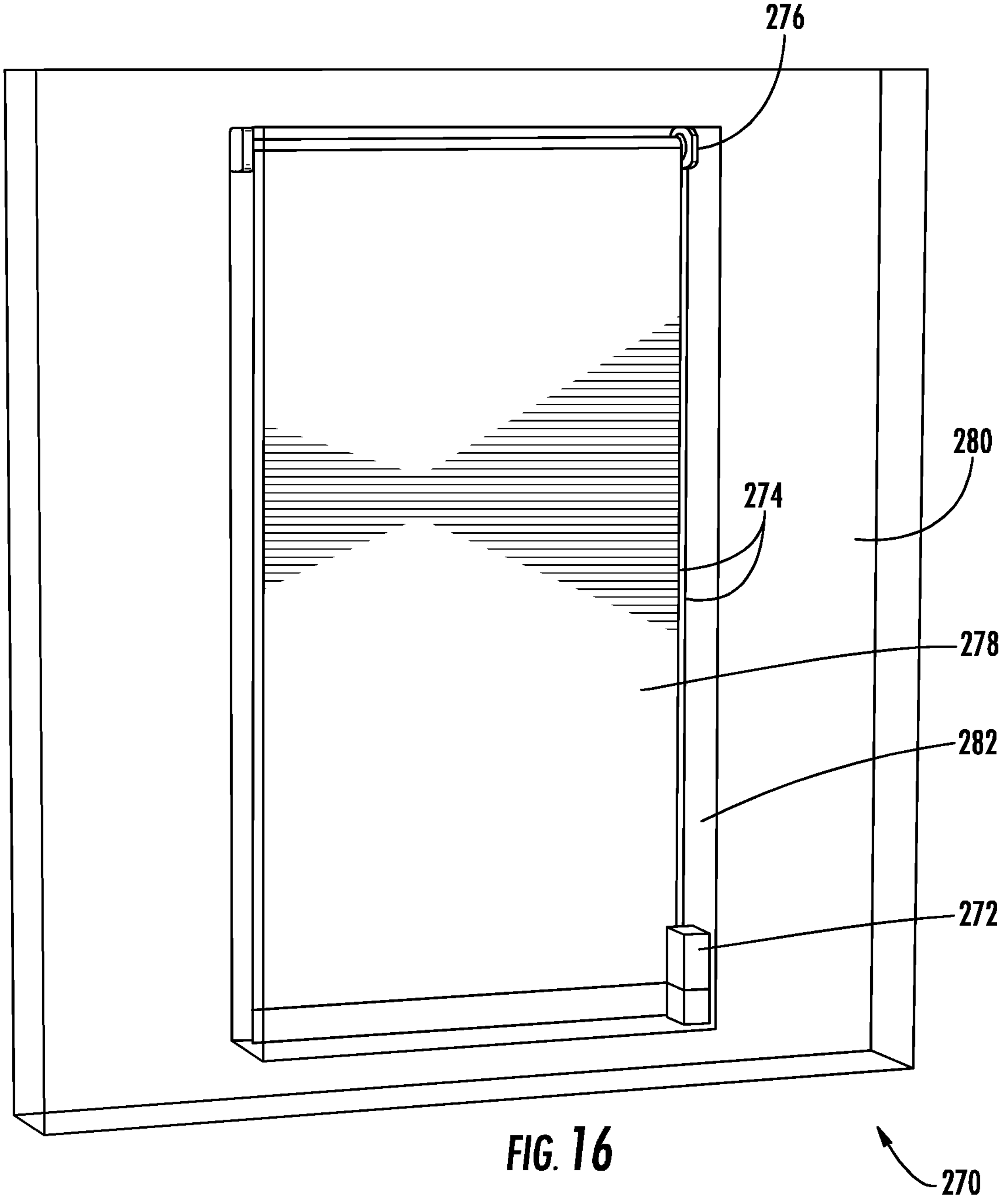
FIG. 16 is a perspective view of a window covering system with installed drive system in a wide recess wall frame installation, according to an embodiment.

FIG. 16 is a perspective view of a roller blind installation 270 with drive system mounted on a wide recess wall frame installation. Drive system 272 is mounted to the wide recess wall frame 282 at the right side, bottom of the window adjacent flat wall 280. Continuous cord loop 274 extends substantially vertically below the headrail 276 of a roller blind assembly to the drive system 272. The roller blind installation 270 is shown with the window covering, fabric 278, in a spread or lowered configuration.

Figure 17:
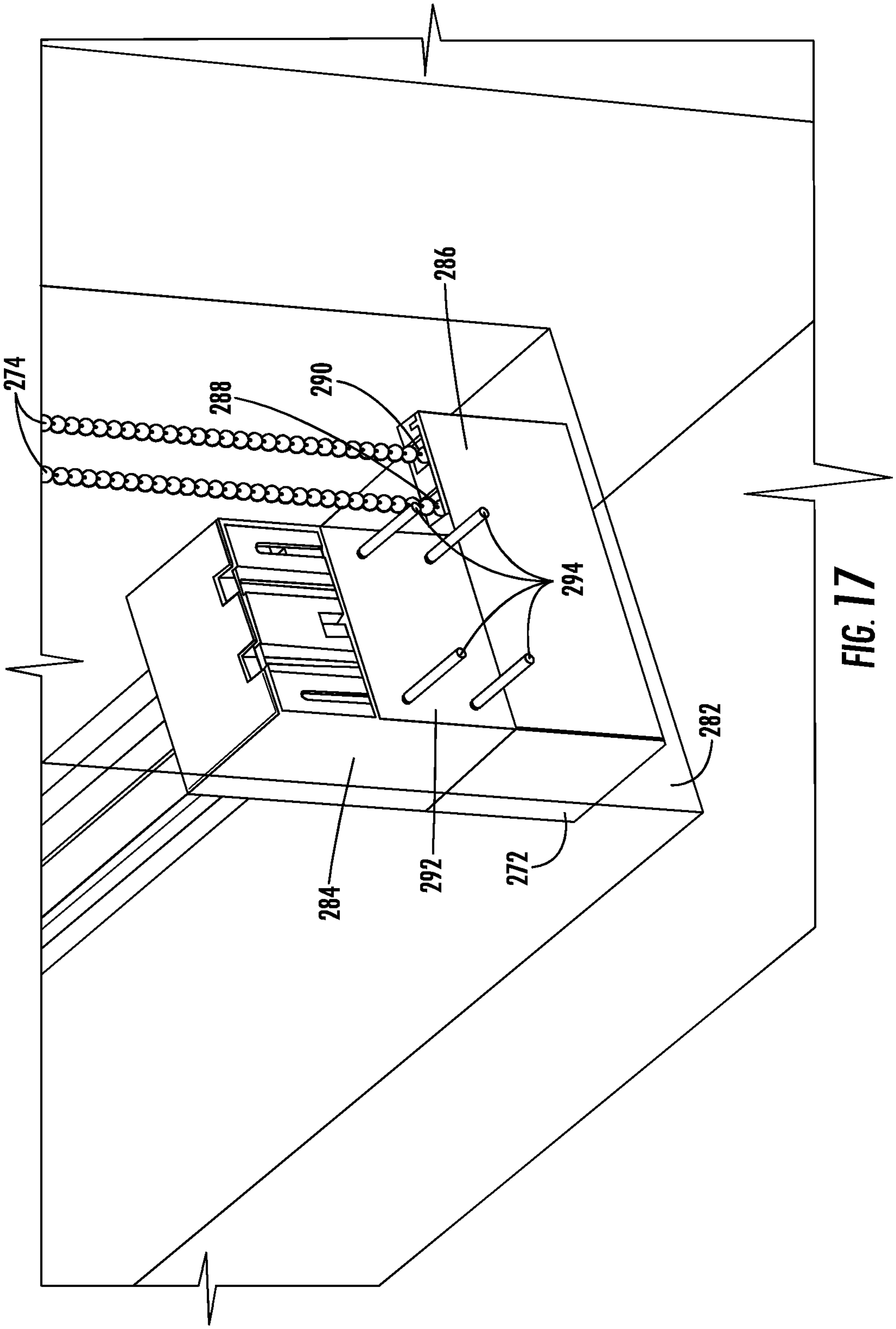
FIG. 17 is a phantom perspective view of an installed drive system from the interior of a wide recess wall frame installation of a window covering system, according to the embodiment of FIG. 16.

FIG. 17 shows the drive system 272 as viewed from an interior perspective of the wide recess wall frame installation, seen in phantom. Housing 284 includes attached channel system 286. Ball chain 274 extends vertically above first channel aperture 288 (the front cord of the ball chain) and second channel aperture 290 (the rear cord of the ball chain) of channel system 286. In an embodiment, drive system 272 is mounted to wide recess wall frame 282 using four mounting screws 294. In an embodiment, drive system 272 may have an internal configuration as shown in FIG. 3. The drive system 272 of FIG. 17 includes a channel system 286 that is relatively thin relative to the width of the housing 284, and that is located close to the inner wall. This is also true of other inner wall mounting configurations; see FIG. 13, channel system 234; and FIG. 15, channel system 266. In these inner wall mounting configurations, having the continuous cord loop extend from the channel system close to the inner wall, rather than from the main housing that protrudes from the inner wall, creates a desirable separation or gap between the continuous cord loop and the fabric or other window covering. The channel system is located in the gap between the fabric or other window covering and the inner wall, which prevents the fabric or other window covering from hitting or interfering with the drive system housing.

Figure 18:
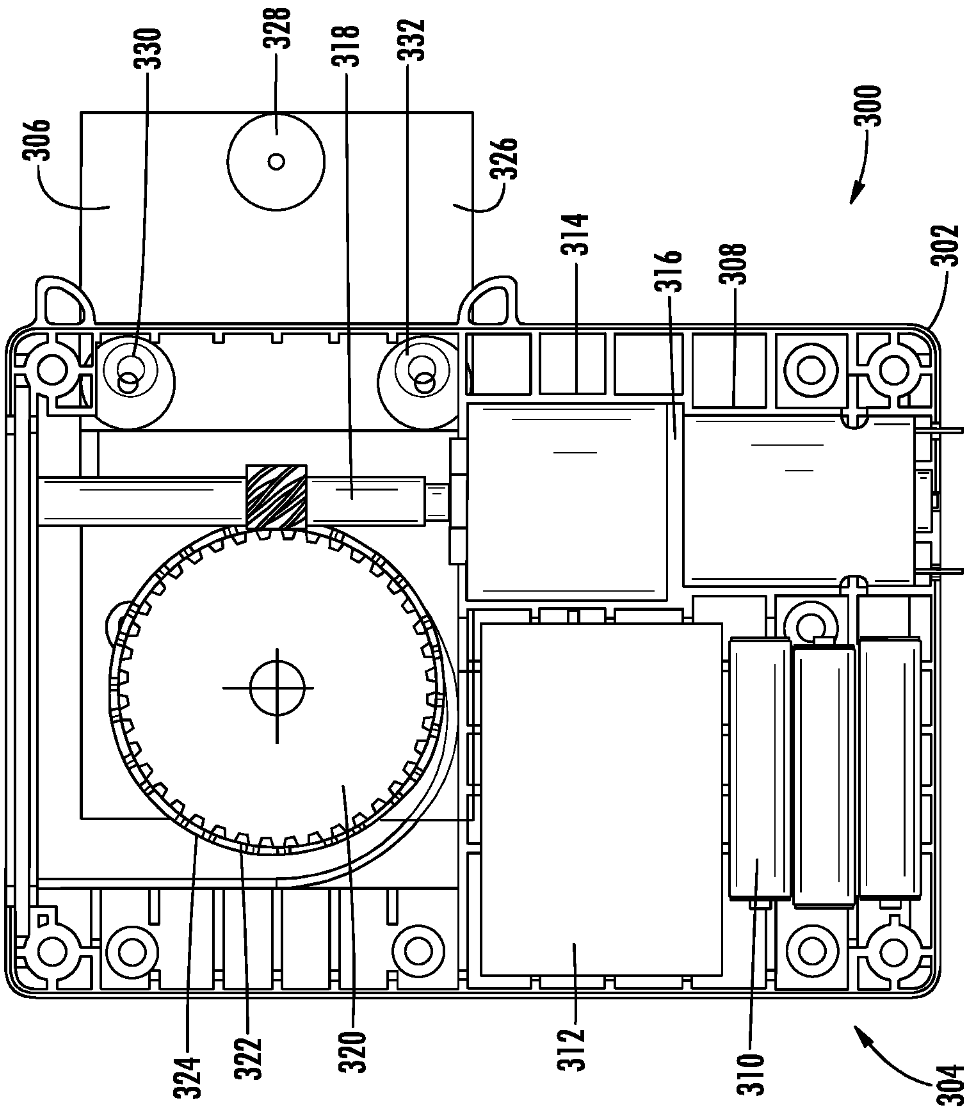
FIG. 18 is an elevation view of a drive system for a window covering system, according to a further embodiment.

FIG. 18 shows in an elevation view the operational components of a further drive system embodiment 300. A drive assembly 304 of drive system 300 includes motor 308 coupled to planetary gear set 314 by adapter plate 316. Planetary gear set 314 is coupled to pinion 318, which may be a helical pinion, worm pinion, or hypoid pinion. Pinion drives gear 320, which may be a face gear, worm gear, or helical gear. Gear 320 is coupled to driven wheel 324 by clutch 322. In an embodiment, clutch 322 is an electrically operated device that transmits torque mechanically, such as an electromagnetic clutch. Driven wheel 324 may be a sprocket, pulley, or other rotary structure, depending on the nature of the continuous cord loop to be engaged by the driven wheel. Other drive components of drive assembly 304 include batteries 310 and printed circuit board 312.

The housing 302 of drive system 300 houses the drive assembly, and a channel system 306. Channel system 306 redirects a continuous cord loop (not shown) engaged by the driven wheel 324, and includes a channel support 326. In an embodiment, channel support 326 is a plate or other member that is pivotally mounted at or near the driven wheel 324. Channel support 326 may pivot between the position seen in FIG. 18, to a position in which channel support 326 extends vertically above housing 302, and to a third position in which channel support 326 extends to the left of housing 302.

Channel system 306 includes three redirecting wheels including first wheel 328, second wheel 330, and third wheel 332. These redirecting wheels may be sprockets or pulleys, depending on the nature of the continuous cord loop to be engaged by one or more of the redirecting wheels. In the embodiment shown in FIG. 18, one cord of the continuous cord loop can be redirected around the redirecting wheel 328, and the other cord of the continuous cord loop can be redirected around the redirecting wheel 330, in both cases extending vertically from the redirecting wheel. In a configuration in which the channel support 326 extends to the left side of housing 302, one cord of the continuous cord loop can be redirected around the redirecting wheel 328, and the other cord of the continuous cord loop can be redirected around the redirecting wheel 332, in both cases extending vertically from the redirecting wheel. In a configuration in which the channel support 326 extends vertically above the housing 302, one cord of the continuous cord loop can extend vertically between the redirecting wheel 328 and the redirecting wheel 330, optionally engaging the redirecting wheel 330 without being substantially redirected by this wheel. In this configuration, the other cord of the continuous cord loop can extend vertically between the redirecting wheel 328 and the redirecting wheel 332, optionally engaging the redirecting wheel 332 without being substantially redirected by this wheel.

Figure 19:
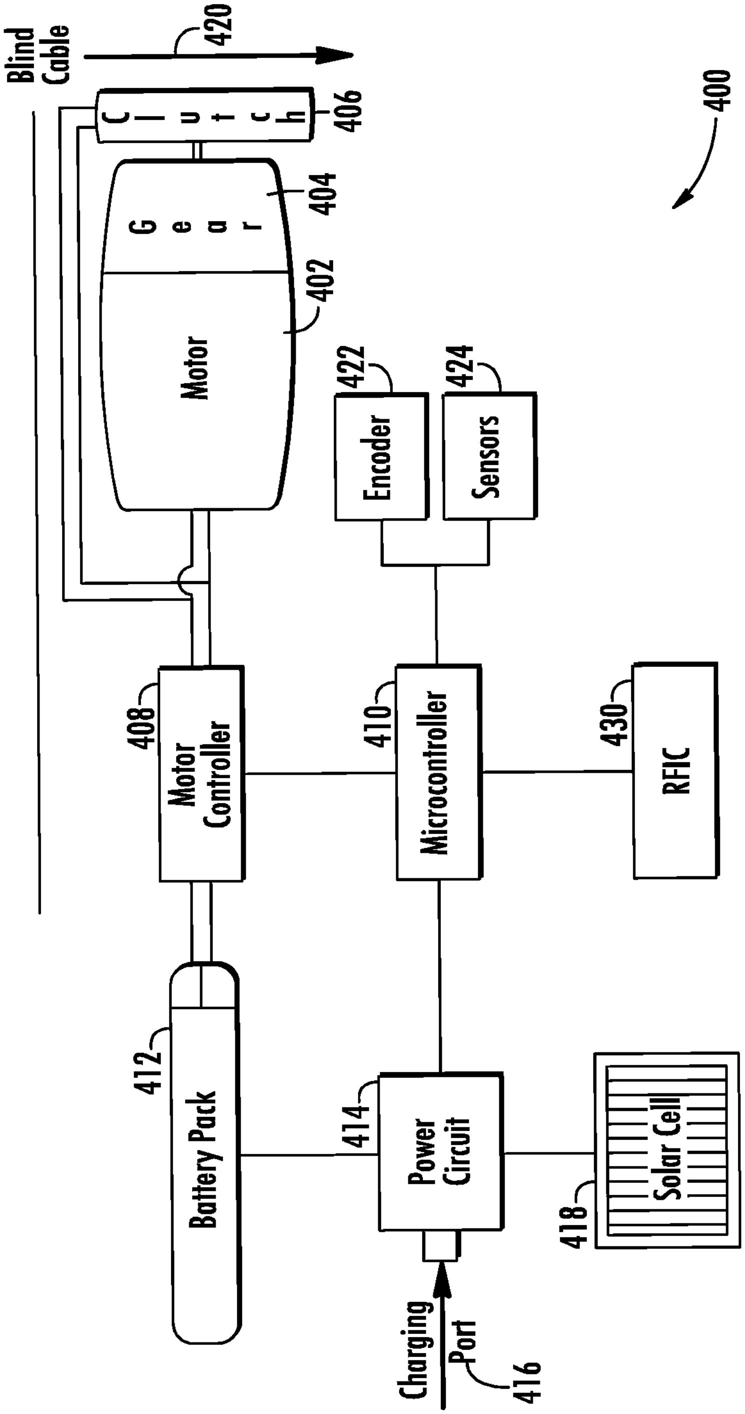
FIG. 19 is a block diagram of a control system architecture of a drive system for a window covering system, according to an embodiment.

FIG. 19 is a diagram of a motor drive control system 400 for continuous cord loop driven window covering systems. Control system 400 includes DC motor 402, gear assembly 404, and clutch 406. DC motor 402 and clutch 406 are both electrically powered by motor controller 408. Power sources include battery pack 412. Users may recharge battery pack 412 via power circuit 414 using a charging port 416, or a solar cell array 418. The central control element of control system 400 is microcontroller 410, which monitors and controls power circuit 414 and motor controller. Inputs to microcontroller 410 include motor encoder 422, and sensors 424. In an embodiment, sensors 424 include one or more temperature sensor, light sensor, and motion sensor. In addition, microcontroller 410 may have wireless network communication with various RF modules via radio frequency integrated circuit (RFIC) 430. RFIC 430 controls two way wireless network communication by the control system 400. Wireless networks and communication devices can include local area network (LAN) which may include a user remote control device, wide area network (WAN), wireless mesh network (WMN), "smart home" systems and devices such as hubs and smart thermostats, among numerous other types of communication device or system. Control system 400 may employ standard wireless communication protocols such as Bluetooth, Wifi, Z-Wave, Zigbee and THREAD.

In an embodiment, control system 400 regulates lighting, controls room temperature, and limits glare, and controls other window covering functions such as privacy.

In an embodiment, control system 400 monitors various modes of system operation and engages or disengages the clutch 406 depending on the operational state of system 400. In one embodiment, when DC motor 402 is rotating its output shaft under user (operator) control, or under automatic control by microcontroller 410, clutch 406 is engaged thereby advancing continuous cord loop 420. When microcontroller 410 is not processing an operator command or automated function to advance the continuous cord loop, clutch 406 is disengaged, and a user may advance continuous cord loop manually to operate the windows covering system. In the event of power failure, clutch 406 will be disengaged, allowing manual operation of the windows covering system.

Figure 20:
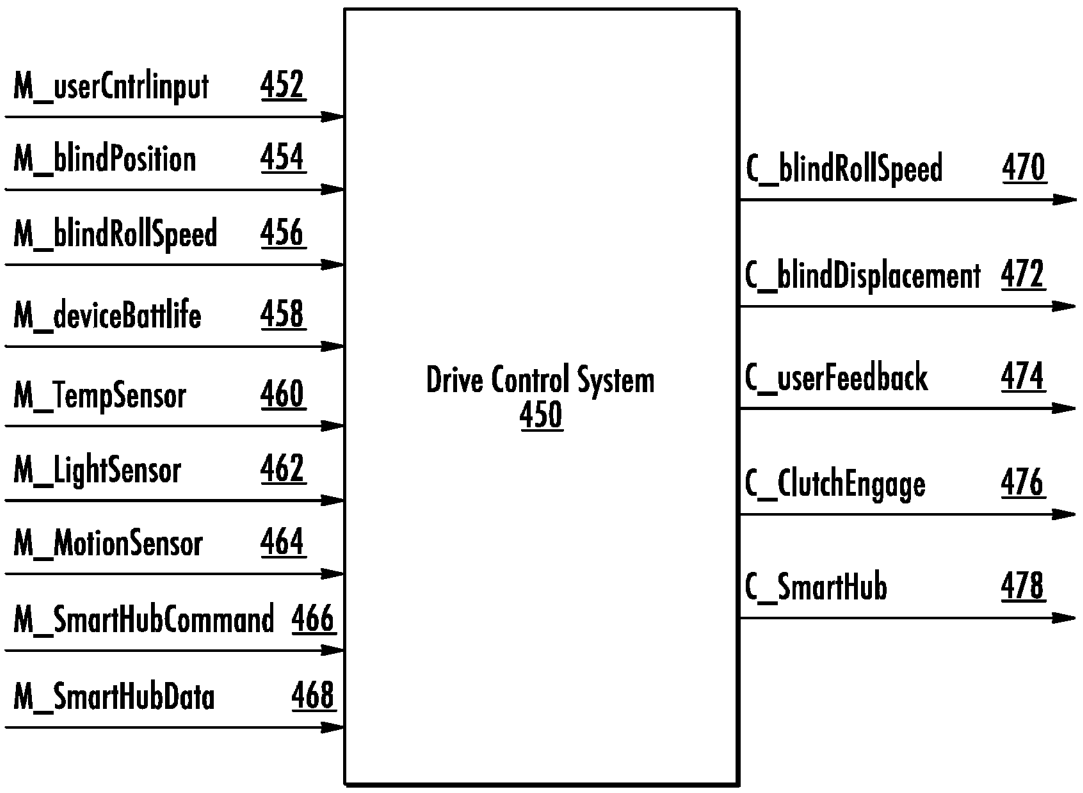
FIG. 20 is a schematic diagram of monitored and controlled variables of a drive system controller for a window covering system, according to an embodiment.

FIG. 20 is an input/output (black box) diagram of a continuous cord loop windows blind drive control system 450.

Monitored variables (inputs) of drive control system 450 include:

452—user input command for blind control (e.g., string packet containing command).

454—distance of current position from top of blind (e.g., in meters).

456—rolling speed of the blind (e.g., in meters per second).

458—current charge level of battery (e.g., in mV).

460—temperature sensor output (e.g., in mV).

462—light sensor output (e.g., in mV).

464—motion sensor output (e.g., in mV).

466—smart-home hub command (e.g., string packet containing command).

468—smart-home data (e.g., thermostat temperature value in degrees Celsius).

Controlled variables (outputs) of drive control system 450 include:

470—intended rolling speed of the blind at a given time (e.g., in meters per second).

472—intended displacement from current position at a given time (e.g., in meters).

474—feedback command from the device for user (e.g., string packet containing command).

476—clutch engage/disengage command at a given time.

478—output data to smart-home hub (e.g., temperature value in degrees Celsius corresponding to temperature sensor output 460).

In an embodiment, drive control system 450 sends data (such as sensor outputs 460, 462, and 464) to a third party home automation control system or device. The third party system or device can act upon this data to control other home automation functions. Third party home automation devices include for example "smart thermostats" such as the Honeywell Smart Thermostat (Honeywell International Inc., Morristown, New Jersey); Nest Learning Thermostat (Nest Labs, Palo Alto, California); Venstar programmable thermostat (Venstar, Inc., Chatsworth, California); and Lux programmable thermostat (Lux Products, Philadelphia, Pennsylvania). Other home automation devices include HVAC (heating, ventilating, and air conditioning) systems, and smart ventilation systems.

In another embodiment, drive control system 450 accepts commands, as well as data, from third party systems and devices and acts upon these commands and data to control the windows covering system.

In an embodiment, the drive control system 450 schedules operation of the windows covering system via user-programmed schedules.

In another embodiment, drive control system 450 controls the windows covering system based upon monitored sensor outputs. For example, based upon light sensor output 462, the window covering system may automatically open or close based upon specific lighting conditions such as opening blinds at sunrise. In another example, based upon motion sensor output 464, the system may automatically open blinds upon detecting a user entering a room. In a further example, based upon temperature sensor output 460, the system may automatically open blinds during daylight to warm a cold room. Additionally, the system may store temperature sensor data to send to other devices.

In a further embodiment drive control system 450 controls multiple windows covering systems, and may group window covering systems to be controlled together (e.g., for windows facing in a certain direction, or windows located on a given story of a building).

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A drive system for use with a window covering system, the window covering system including a roller blind mechanism for raising and lowering a window covering and a continuous cord loop operatively connected to the roller blind mechanism, the drive system comprising:

a motor configured to rotate a driven wheel in first and second directions, wherein the driven wheel is configured to advance the continuous cord loop to cause the roller blind mechanism to raise the window covering during rotation of the driven wheel in the first direction and to advance the continuous cord loop to cause the roller blind mechanism to lower the window covering during rotation of the driven wheel in the second direction;

a controller for providing drive control outputs to the motor;

a housing for the motor, the driven wheel, the controller, and a mounting mechanism;

a mounting bracket; and a plurality of drive wheels comprising at least two of a sprocket, a pulley, or other rotary structure configured for the continuous cord loop, wherein the continuous cord loop comprises a rope, cord, beaded chain, or ball chain forming an endless loop, wherein during installation by a user of the drive system, the drive system is configured for the user to select the driven wheel from the plurality of drive wheels, to install the selected driven wheel within the housing, to attach the continuous cord loop to the selected driven wheel, to mount the mounting bracket below the roller blind mechanism, and to attach the mounting mechanism to the mounting bracket and adjust the height of the housing to tension the continuous cord loop and lock the continuous cord loop into the selected driven wheel.

2. The drive system of claim 1, wherein the housing for the motor, the driven wheel, the controller, and the mounting mechanism comprises a main housing and a housing cover, wherein during the installation of the drive system, the drive system is configured for the user to join the housing cover to the main housing to cover the selected driven wheel after attaching the continuous cord loop to the selected driven wheel.

3. The drive system of claim 2, wherein the drive system is configured for the user to join the housing cover to the main housing to define a first opening and a second opening, wherein the continuous cord loop comprises front and rear cords that extend substantially vertically above the housing through the first opening and the second opening after attaching the continuous cord loop to the driven wheel and joining the housing cover to the main housing.

4. The drive system of claim 1, wherein the mounting mechanism is configured to engage the housing to the mounting bracket while lowering the housing relative to the mounting bracket during installation.

5. The drive system of claim 4, wherein the mounting mechanism include a ratchet device that prevents the housing from rising and secures the continuous cord loop within the selected driven wheel.

6. The drive system of claim 5, wherein the mounting mechanism further includes a release mechanism for releasing the mounting mechanism from the ratchet device to permit the housing to rise.

7. The drive system of claim 1, wherein the mounting mechanism has a first set of teeth and the mounting bracket has a second set of teeth, wherein the mounting mechanism is configured for the first set of teeth to engage the second set of teeth while lowering the housing relative to the mounting bracket during installation.

8. The drive system of claim 1, wherein the mounting bracket is configured to attach the mounting mechanism to the mounting bracket in an orientation of the housing selected during installation.

9. The drive system of claim 1, wherein the coupling mechanism comprises a gear assembly and a clutch.

10. The drive system of claim 1, wherein the continuous cord loop is a beaded chain or ball chain, and the selected driven wheel is a sprocket.

11. The drive system of claim 1, wherein the continuous cord loop is a rope or cord, and the selected driven wheel is a pulley.

12. A drive system for use with a window covering system, the window covering system including a roller blind mechanism for raising and lowering a window covering and a continuous cord loop operatively connected to the roller blind mechanism; the drive system comprising:

a motor configured to rotate a driven wheel in first and second directions, wherein the driven wheel is configured to advance the continuous cord loop to cause the roller blind mechanism to raise the window covering during rotation of the driven wheel in the first direction and to advance the continuous cord loop to cause the roller blind mechanism to lower the window covering during rotation of the driven wheel in the second direction;

a controller for providing drive control outputs to the motor;

a housing for the motor, the driven wheel, and the controller; and a plurality of drive wheels comprising at least two of a sprocket, a pulley, or other rotary structure configured for the continuous cord loop, wherein the continuous cord loop comprises a rope, cord, beaded chain or ball chain forming an endless loop, wherein during installation by a user of the drive system, the drive system is configured for the user to select the driven wheel from the plurality of drive wheels, to install the selected driven wheel within the housing, to attach the continuous cord loop to the selected driven wheel, and to calibrate the controller to set a top position and a bottom position wherein following the calibration the controller limits the raising and lowering the window covering between the top position and the bottom position.

13. The drive system of claim 12, further comprising a coupling mechanism coupling the driven wheel to the output shaft of the motor, wherein the coupling mechanism includes an engaged configuration in which rotation of the output shaft of the motor causes rotation of the driven wheel and a disengaged configuration in which the rotation of the output shaft of the motor does not cause the rotation of the driven wheel.

14. The drive system of claim 13, wherein the coupling mechanism comprises a gear assembly and a clutch.

15. The drive system of claim 12, wherein the calibration of the top position and the bottom position comprises calibration of the bottom position followed by calibration of the top position.

16. The drive system of claim 12, wherein the controller for providing drive control outputs to the motor comprises a microcontroller and a motor encoder.

17. The drive system of claim 12, wherein the housing for the motor, the driven wheel, and the controller comprises a main housing and a housing cover, wherein during the installation of the drive system, the drive system is configured for the user to join the housing cover to the main housing to cover the selected driven wheel after attaching the continuous cord loop to the selected driven wheel.

18. The drive system of claim 17, wherein the drive system is configured for the user to join the housing cover to the main housing to define a first opening and a second opening, wherein the continuous cord loop comprises front and rear cords that extend substantially vertically above the housing through the first opening and the second opening after attaching the continuous cord loop to the selected driven wheel and joining the housing cover to the main housing.

19. The drive system of claim 12, wherein the continuous cord loop is a beaded chain or ball chain, and the selected driven wheel is a sprocket.

20. The drive system of claim 12, wherein the continuous cord loop is a rope or cord, and the selected driven wheel is a pulley.

* * * * *